(12) United States Patent
Abbas et al.

(10) Patent No.: US 11,756,152 B2
(45) Date of Patent: Sep. 12, 2023

(54) APPARATUS AND METHODS FOR THE OPTIMAL STITCH ZONE CALCULATION OF A GENERATED PROJECTION OF A SPHERICAL IMAGE

(71) Applicant: GoPro, Inc., San Mateo, CA (US)

(72) Inventors: Adeel Abbas, Carlsbad, CA (US); Timothy Macmillan, La Honda, CA (US); Cesar Douady-Pleven, Orsay (FR)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 17/960,040

(22) Filed: Oct. 4, 2022

(65) Prior Publication Data

US 2023/0027366 A1 Jan. 26, 2023

Related U.S. Application Data

(60) Division of application No. 17/080,693, filed on Oct. 26, 2020, now Pat. No. 11,475,534, which is a
(Continued)

(51) Int. Cl.
*G06T 3/00* (2006.01)
*H04N 23/45* (2023.01)
(Continued)

(52) U.S. Cl.
CPC ............ *G06T 3/005* (2013.01); *G06T 3/0062* (2013.01); *G06T 3/0068* (2013.01);
(Continued)

(58) Field of Classification Search
CPC ..... G06T 3/005; G06T 3/0062; G06T 3/0068; G06T 3/4038; G06T 11/60;
(Continued)

(56) References Cited

U.S. PATENT DOCUMENTS 6,947,059 B2 * 9/2005 Pierce .................. H04N 5/2628
348/E13.008
8,217,956 B1 7/2012 Jin
(Continued)

FOREIGN PATENT DOCUMENTS

CN 105247573 A 1/2016
EP 1909226 4/2008
(Continued)

OTHER PUBLICATIONS

Achanta R., et al., 'Slic Superpixeis Gompared to State-of-The-Art Superpixei Methods,' IEEE Transactions on Pattern Analysis and Machine intelligence, 2012, vol. 34 (11), pp. 2274-2282.
(Continued)

*Primary Examiner* — Michael S Osinski
(74) *Attorney, Agent, or Firm* — Young Basile Hanlon & MacFarlane, P.C.

(57) ABSTRACT

Apparatus and methods for the stitch zone calculation of a generated projection of a spherical image. In one embodiment, a computing device is disclosed which includes logic configured to: obtain a plurality of images; map the plurality of images onto a spherical image; re-orient the spherical image in accordance with a desired stitch line and a desired projection for the desired stitch line; and map the spherical image to the desired projection having the desired stitch line. In a variant, the desired stitch line is mapped onto an optimal stitch zone, the optimal stitch zone characterized as a set of points that defines a single line on the desired projection in which the set of points along the desired projection lie closest to the spherical image in a mean square sense.

20 Claims, 17 Drawing Sheets

Related U.S. Application Data continuation of application No. 16/459,482, filed on Jul. 1, 2019, now Pat. No. 10,817,978, which is a continuation of application No. 15/289,851, filed on Oct. 10, 2016, now Pat. No. 10,339,627.

(51) Int. Cl.
*H04N 23/698* (2023.01)
*G06T 3/40* (2006.01)

(52) U.S. Cl.
CPC .......... *G06T 3/4038* (2013.01); *H04N 23/45* (2023.01); *H04N 23/698* (2023.01)

(58) Field of Classification Search
CPC ......... G06T 2207/20221; G06T 3/0018; G06T 5/006; G06T 5/50; G06T 7/33; G06T 15/205; H04N 23/45; H04N 23/698; H04N 5/265; H04N 5/2628; H04N 23/90; H04N 13/178; H04N 13/194; H04N 13/243; H04N 21/4728; H04N 23/51; H04N 13/156; H04N 13/239; H04N 21/816; H04N 2013/0088; G02B 13/06; G02B 27/017; G03B 37/00; G03B 37/04
See application file for complete search history.

(56) References Cited

U.S. PATENT DOCUMENTS

| | | | |
|---|---|---|---|
| 8,395,657 B2 | 3/2013 | Jacob | |
| 8,554,014 B2 | 10/2013 | Levy | |
| 8,606,073 B2 | 12/2013 | Woodman | |
| 8,768,098 B2 | 7/2014 | Zhang | |
| 9,171,577 B1 | 10/2015 | Newman | |
| 9,277,122 B1 | 3/2016 | Imura | |
| 9,378,544 B2 | 6/2016 | Cha | |
| 9,575,803 B2 | 2/2017 | Chauvet | |
| 9,589,350 B1 | 3/2017 | Kozko | |
| 9,652,856 B2 | 5/2017 | Takenaka | |
| 9,661,245 B2* | 5/2017 | Kawano | G06V 20/40 |
| 9,681,111 B1 | 6/2017 | Newman | |
| 9,792,709 B1 | 10/2017 | Meler | |
| 9,854,164 B1 | 12/2017 | Kozko | |
| 9,973,694 B1 | 5/2018 | Van Hoff | |
| 9,986,155 B2 | 5/2018 | Chang | |
| 9,990,753 B1 | 6/2018 | Cai | |
| 9,992,412 B1 | 6/2018 | Tyagi | |
| 10,043,237 B2 | 8/2018 | Steel | |
| 10,136,055 B2 | 11/2018 | Lei | |
| 10,157,448 B2 | 12/2018 | Nguyen | |
| 10,194,097 B2 | 1/2019 | Abbas | |
| 10,217,189 B2 | 2/2019 | Russell | |
| 10,339,627 B2 | 7/2019 | Abbas | |
| 10,404,915 B1 | 9/2019 | Chen | |
| 10,462,384 B2 | 10/2019 | Abbas | |
| 10,614,553 B1* | 4/2020 | Wang | H04N 5/265 |
| 10,634,496 B2 | 4/2020 | Kumagai | |
| 10,692,274 B2* | 6/2020 | Lim | G06T 3/0018 |
| 10,817,978 B2 | 10/2020 | Abbas | |
| 10,992,881 B2 | 4/2021 | Abbas | |
| 2002/0018047 A1 | 2/2002 | Okada | |
| 2002/0030748 A1 | 3/2002 | Kitaguchi | |
| 2003/0007567 A1 | 1/2003 | Newman | |
| 2006/0072176 A1 | 4/2006 | Silverstein | |
| 2006/0187234 A1 | 8/2006 | Deng | |
| 2006/0256113 A1 | 11/2006 | Grover | |
| 2008/0074489 A1 | 3/2008 | Zhang | |
| 2010/0054628 A1 | 3/2010 | Levy | |
| 2013/0021433 A1 | 1/2013 | Belsarkar | |
| 2013/0063555 A1 | 3/2013 | Matsumoto | |
| 2013/0169668 A1 | 7/2013 | Lynch | |
| 2013/0169685 A1 | 7/2013 | Lynch | |
| 2014/0267593 A1 | 9/2014 | Kim | |
| 2014/0362176 A1 | 12/2014 | St. Clair | |
| 2015/0002641 A1 | 1/2015 | Kim | |
| 2015/0163526 A1 | 6/2015 | Matsumoto | |
| 2015/0220781 A1 | 8/2015 | Ozaki | |
| 2015/0271402 A1 | 9/2015 | Guo | |
| 2015/0278995 A1 | 10/2015 | Nakahata | |
| 2016/0012855 A1 | 1/2016 | Krishnan | |
| 2016/0037082 A1 | 2/2016 | Wang | |
| 2016/0050369 A1 | 2/2016 | Takenaka | |
| 2016/0112713 A1* | 4/2016 | Russell | H04N 19/20 375/240.09 |
| 2016/0198088 A1 | 7/2016 | Wang | |
| 2016/0212338 A1 | 7/2016 | Seok | |
| 2016/0239340 A1 | 8/2016 | Chauvet | |
| 2016/0274338 A1 | 9/2016 | Davies | |
| 2016/0295108 A1 | 10/2016 | Cao | |
| 2016/0360104 A1 | 12/2016 | Zhang | |
| 2017/0006219 A1 | 1/2017 | Adsumilli | |
| 2017/0019595 A1 | 1/2017 | Chen | |
| 2017/0046820 A1 | 2/2017 | Steel | |
| 2017/0078570 A1 | 3/2017 | Ito | |
| 2017/0230587 A1 | 8/2017 | Kanai | |
| 2017/0287200 A1 | 10/2017 | Forutanpour | |
| 2017/0330337 A1* | 11/2017 | Mizutani | G06T 3/4038 |
| 2017/0345214 A1* | 11/2017 | Hung | H04N 23/698 |
| 2017/0366812 A1 | 12/2017 | Abbas | |
| 2018/0027181 A1 | 1/2018 | Roulet | |
| 2018/0027226 A1 | 1/2018 | Abbas | |
| 2018/0033176 A1 | 2/2018 | Su | |
| 2018/0035047 A1 | 2/2018 | Lei | |
| 2018/0061011 A1 | 3/2018 | Kim | |
| 2018/0075635 A1 | 3/2018 | Choi | |
| 2018/0082401 A1 | 3/2018 | Bai | |
| 2018/0084257 A1 | 3/2018 | Abbas | |
| 2018/0096448 A1* | 4/2018 | Flynn | H04N 23/698 |
| 2018/0101476 A1 | 4/2018 | Abbas | |
| 2018/0114291 A1* | 4/2018 | Yi | H04N 23/698 |
| 2018/0122042 A1 | 5/2018 | Kim | |
| 2018/0146137 A1 | 5/2018 | Roulet | |
| 2018/0205889 A1 | 7/2018 | Abbas | |
| 2018/0227558 A1 | 8/2018 | Oto | |
| 2018/0286026 A1 | 10/2018 | Fan | |
| 2018/0324404 A1* | 11/2018 | Sevigny | G06T 11/60 |
| 2018/0374192 A1 | 12/2018 | Kunkel | |
| 2019/0012818 A1 | 1/2019 | Fine | |
| 2019/0068879 A1 | 2/2019 | Bao | |
| 2019/0196158 A1 | 6/2019 | Yan | |
| 2019/0215420 A1 | 7/2019 | Kaneko | |
| 2019/0289223 A1 | 9/2019 | Abbas | |
| 2019/0311459 A1* | 10/2019 | Zhu | G06T 3/005 |
| 2019/0340737 A1* | 11/2019 | Kawaguchi | H04N 23/698 |
| 2019/0347766 A1* | 11/2019 | Kawaguchi | H04N 23/698 |
| 2019/0353298 A1 | 11/2019 | Okumura | |
| 2019/0379876 A1* | 12/2019 | Hur | H04N 13/139 |
| 2019/0385273 A1 | 12/2019 | Abbas | |
| 2020/0137317 A1 | 4/2020 | Abbas | |
| 2020/0137417 A1 | 4/2020 | Izumi | |
| 2020/0236277 A1 | 7/2020 | Odamaki | |
| 2020/0279515 A1* | 9/2020 | Chiba | G06T 5/50 |
| 2021/0042876 A1 | 2/2021 | Abbas | |
| 2021/0321047 A1 | 10/2021 | Abbas | |
| 2022/0044357 A1* | 2/2022 | Stimm | H04N 7/08 |

FOREIGN PATENT DOCUMENTS

| | | |
|---|---|---|
| WO | 2010025309 | 3/2010 |
| WO | 2014071508 A | 5/2014 |

OTHER PUBLICATIONS

Allene C, et al,, 'Seamless Image-based Texture Atlases Using Multi-band Blending,' Pattern Recognition, 2008. ICPR 2008. 19th International Conference on, 2008. 4 pages.

Badrinarayanan V., et al., 'Segnet: a Deep Convolutional Encoder-Decoder Architecture for Image Segmentation,' arXiv preprint arXiv: 1511.00561, 2015. 14 pages.

Barghout L. and Sheynin J., 'Real-world scene perception and perceptual organization: Lessons from Computer Vision'. Journal of Vision, 2013, vol. 13 (9). (Abstract). 1 page.

(56) References Cited

OTHER PUBLICATIONS

Barghout L., 'Visual Taxometric approach Image Segmentation using Fuzzy-Spatial Taxon Cut Yields Contextually Relevant Regions,' Communications in Computer and Information Science (CCIS), Springer-Verlag, 2014, pp. 163-173.
Bay H., et al., 'Surf: Speeded up Robust Features,' European Conference on Computer Vision, Springer Berlin Heidelberg, 2006, pp. 404-417.
Beier et al., 'Feature-Based Image Metamorphosis,' in Computer Graphics Journal, Jul. 1992, vol. 28 (2), pp. 35-42.
Brainard R.C., et al., "Low-Resolution TV: Subjective Effects of Frame Repetition and Picture Replenishment," Bell Labs Technical Journal, Jan. 1967, vol. 46 (1), pp. 261-271.
Burt et al., 'A Multiresolution Spline with Application to Image Mosaics,' in ACM Transactions on Graphics (TOG), 1983, vol. 2, No. 4, pp. 217-236.
Chan et al., 'Active contours without edges'. IEEE Transactions on Image Processing, 2001, 10 (2), pp. 266-277 (hereinafter 'Chan').
Chang H., etal., 'Super-resolution Through Neighbor Embedding,' Computer Vision and Pattern Recognition, 2004. CVPR2004. Proceedings of the 2004 IEEE Computer Society Conference on, vol. 1, 2004. 8 pages.
Chunxiao Bian et al: "Stitching line and deformation propagation for seamless image stitching", Image and Vision Computing New Zealand, ACM, 2 Penn Plaza, Suite 701 New York NY 10121-0701 USA, Nov. 26, 2012 (Nov. 26, 2012), pp. 262-267, XP058030037.
Co-pending U.S. Appl. No. 14/927,343, filed Oct. 29, 2015, Antoine Meler, 48 pages.
Co-pending U.S. Appl. No. 14/949,786, filed Nov. 23, 2015, Antoine Meler, 70 pages.
Co-pending U.S. Appl. No. 15/001,038, filed Jan. 19, 2016, Newman et al., 66 pages.
Co-pending U.S. Appl. No. 15/289,851, filed Oct. 10, 2016, Abbas et al., 50 pages.
Co-pending U.S. Appl. No. 29/548,661, filed Dec. 15, 2015, Muhlenkamp et al., 15 pages.
Elen, 'Whatever happened to Ambisonics' AudioMedia Magazine, Nov. 1991. 18 pages.
Gracias, et al., 'Fast Image Blending Using Watersheds and Graph Cuts,' Image and Vision Computing, 2009, vol. 27 (5), pp. 597-607.
Herbst E., et al., 'Occlusion Reasoning for Temporal Interpolation Using Optical Flow,' Department of Computer Science and Engineering, University of Washington, Tech. Rep. UW-CSE-09-08-01, 2009. 41 pages.
Jakubowski M., et al., 'Block-based motion estimation algorithmsa survey,' Opto-Eiectronics Review 21, No. 1 (2013), pp. 88-102.
Kendall A., et al., 'Bayesian Segnet: Model Uncertainty in Deep Convolutional Encoder-Decoder Architectures for Scene Understanding,' arXiv: 1511.02680, 2015. (11 pages).

Lowe D.G., 'Object Recognition From Local Scale-invariant Features,' Computer vision, The proceedings of the seventh IEEE international conference on 1999, vol. 2, pp. 1150-1157.
Mitzel D., et al., 'Video Super Resolution Using Duality Based TV-I1 Optical Flow,' Joint Pattern Recognition Symposium, 2009, pp. 432-441.
PCT International Search Report for PCT/US2017/067392 dated May 22, 2018, 5 pages.
PCT ISR and Written Opinion for PCT/US2017/055885 dated Dec. 6, 2017 (14 pages).
Perez et al., 'Poisson Image Editing,' in ACM Transactions on Graphics (TOG), 2003, vol. 22, No. 3, pp. 313-318.
Schick A., et al., "Improving Foreground Segmentations with Probabilistic Superpixel Markov Random Fields," 2012 IEEE Computer Society Conference on Computer Vision and Pattern Recognition Workshops, 2012, pp. 27-31.
Schwartz, E., et al., "Implementation of Compression with Reversible Embedded Wavelets," In Proc. SPIE, 1995, 12 pages.
Suzuki et al., 'Inter Frame Coding with Template Matching Averaging,' in IEEE international Conference on Image Processing Proceedings (2007), vol. (III), pp. 409-412.
Szeliski R., "Computer Vision: Algorithms and Applications," Springer Science & Business Media, 2010, 979 pages.
Szeliski R., "Image Alignment and Stitching: A Tutorial," Foundations and Trends in Computer Graphics and Vision, 2006, vol. 2 (1), pp. 1-59.
Thaipanich T., et al., "Low Complexity Algorithms for Robust Video frame rate up-conversion (FRUC) technique," IEEE Transactions on Consumer Electronics, Feb. 2009, vol. 55 (1),pp. 220-228.
Vass, J., et al., 'Efficient Three-Dimensional Wavelet Codecs for Networked Video Communication,' in Proceedings of IEEE International Conference on Image Processing, Kobe, Japan, Oct. 1999, pp. 565-569.
Xiao, et al., 'Multiple View Semantic Segmentation for Street View Images,' 2009 IEEE 12th International Conference on Computer Vision, 2009, pp. 686-693.
Xiaoyong Sun et al: "A novel algorithm to stitch multiple views in image mosaics", Acoustics, Speech, and Signal Processing, 2004. Proceedings. (ICASSP ' 04). IEEE International Conference On Montreal, Quebec, Canada May 17-21, 2004, Piscataway, NJ, USA,IEEE, Piscataway, NJ, USA, vol. 3, May 17, 2004 (May 17, 2004), pp. 481-484, XP010718231.
Xiong Y et al., 'Gradient Domain Image Blending and Implementation on Mobile Devices,' International Conference On Mobile Computing, Applications, and Services, Springer Berlin Heidelberg, 2009, pp. 293-306.
Zhai et al., "A Low Complexity Motion Compensated Frame Interpolation Method," in IEEE International Symposium on Circuits and Systems (2005), pp. 4927-4930.
Zhang., "A Flexible New Technique for Camera Calibration" IEEE Transactions, dated Nov. 2000, vol. 22, No. 11, pp. 1330-1334.

\* cited by examiner

APPARATUS AND METHODS FOR THE OPTIMAL STITCH ZONE CALCULATION OF A GENERATED PROJECTION OF A SPHERICAL IMAGE

CROSS-REFERENCE TO RELATED APPLICATION(S)

This application is a divisional of U.S. patent Ser. No. 17/080,693, filed Oct. 26, 2020, which is a continuation of U.S. patent Ser. No. 16/459,482, filed Jul. 1, 2019, now U.S. Pat. No. 10,817,978, which is a continuation of U.S. patent Ser. No. 15/289,851, filed Oct. 10, 2016, now U.S. Pat. No. 10,339,627, the entire disclosures of which are hereby incorporated by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present disclosure relates generally to video image post-processing and in one exemplary aspect, to methods and apparatus for the optimal stitch zone calculation of a generated projection of a spherical image.

BACKGROUND

Spherical images are typically obtained by capturing multiple images with overlapping fields of view from different cameras and combining ("stitching") these images together in order to provide a two-dimensional projection. Conventional stitching algorithms may result in undesirable artifacts around the stitch lines due to imperfections in the stitching process.

Moreover, prior techniques involved the use of equirectangular projections for handling these spherical images (e.g., for so-called virtual reality (VR) content) and accordingly compression techniques have been developed that may be less than optimal when handling content embodied within these equirectangular projections. Accordingly, techniques are needed to improve upon these conventional stitching algorithms, and improve upon the compression efficiencies associated with the transmission and storage of these projected images in order to allow, for example, modern display devices to perform to their capabilities when displaying, inter alia, spherical image video content.

SUMMARY

The present disclosure satisfies the foregoing needs by providing, inter alia, methods and apparatus for the optimal stitch zone calculation of a generated projection of a spherical image.

In a first aspect of the present disclosure, an apparatus configured to generate an optimal stitch zone calculation of a generated projection of a spherical image is disclosed. In one embodiment, the apparatus includes a processing apparatus; and a storage apparatus in data communication with the processing apparatus, the storage apparatus having a non-transitory computer readable medium comprising instructions which are configured to, when executed by the processing apparatus, cause the computerized apparatus to: obtain a plurality of images, the plurality of images configured to represent a panoramic image; map the plurality of images into a spherical collection of images; re-orient the spherical collection of images in accordance with an optimal stitch zone for a desired projection; the optimal stitch zone characterized as a set of points that defines a single line on the desired projection in which the set of points along the desired projection lie closest to the spherical collection of images in a mean square sense.

In a second aspect of the present disclosure, a method of generating an optimal stitch zone calculation of a generated projection of a spherical image is disclosed. In one embodiment, the method includes obtaining a plurality of images; mapping the plurality of images onto a spherical image; re-orienting the spherical image in accordance with an optimal stitch zone for a desired projection, the optimal stitch zone characterized as a set of points that defines a single line on the desired projection in which the set of points along the desired projection lie closest to the spherical collection of images in a mean square sense.

In a third aspect of the present disclosure, a computing device is disclosed. In one embodiment, the computing device includes logic configured to: obtain a plurality of images; map the plurality of images onto a spherical image; re-orient the spherical image in accordance with a desired stitch line and a desired projection for the desired stitch line; and map the spherical image to the desired projection having the desired stitch line.

In one variant, the plurality of images are obtained via the use of a spherical camera system having a image capture devices, each of the image capture devices configured to have an overlapping field of view with at least one other one image capture devices.

In another variant, the computing device further includes logic configured to align one or more features present within the overlapping field of view such that a first image of the images is aligned with a second image of the images, the overlapping field of view including at least a portion of the desired stitch line.

In yet another variant, the desired stitch line includes a meridian stitch zone and the desired projection is selected from the group consisting of: an equirectangular projection, a cubic projection, and an octahedron projection.

In yet another variant, the computing device further includes logic configured to generate a bandwidth requirement for the desired projection and cause the display of the generated bandwidth requirement on a user's display.

In yet another variant, the computing device further includes logic configured to generate a plurality of respective bandwidth requirements for a plurality of possible projections and cause the display of the plurality of respective bandwidth requirements on a user's display.

In yet another variant, the display of the plurality of respective bandwidth requirements on the user's display is performed prior to the spherical image being mapped onto the desired projection having the desired stitch line.

In a fourth aspect of the present disclosure, a computer readable storage apparatus is disclosed. In one embodiment, the computer readable storage apparatus includes a non-transitory computer readable medium having instructions which are configured to, when executed by a processing apparatus, cause a computerized apparatus to: obtain a plurality of images, the plurality of images configured to represent a panoramic image; map the plurality of images into a spherical collection of images; re-orient the spherical collection of images in accordance with a desired stitch line for a desired projection; and map the spherical collection of images into the desired projection comprising the desired stitch line.

In one variant, the desired stitch line includes an optimal stitch zone, the optimal stitch zone characterized as a set of points that defines a single line on the desired projection in which the set of points along the desired projection lie closest to the spherical collection of images in a mean square sense.

In another variant, the desired projection includes an octahedron projection and the desired stitch line lies within a meridian zone for the octahedron projection.

In another variant, the desired projection comprises a cubic projection and the desired stitch line lies either on: (1) an equatorial stitch zone; or (2) a meridian stitch zone.

In yet another variant, the images are mapped into the spherical collection of images in accordance with a Cartesian coordinate system.

In yet another variant, the images are mapped into the spherical collection of images in accordance with a spherical coordinate system.

In yet another variant, the spherical collection of images mapped in accordance with the spherical coordinate system are assumed to have a fixed radial dimension.

In yet another variant, the spherical collection of images mapped in accordance with the spherical coordinate system are assumed to have a variable radial dimension.

In a fifth aspect of the present disclosure, an integrated circuit (IC) apparatus is disclosed. In one embodiment, the IC includes logic configured to: obtain a plurality of images; map the plurality of images onto a spherical image; re-orient the spherical image in accordance with a desired stitch line and a desired projection for the desired stitch line; and map the spherical image to the desired projection having the desired stitch line.

In a sixth aspect of the present disclosure, an apparatus configured to generate a selected projection of a spherical image is disclosed. In one embodiment, the apparatus includes a processing apparatus; and a storage apparatus in data communication with the processing apparatus, the storage apparatus having a non-transitory computer readable medium comprising instructions which are configured to, when executed by the processing apparatus, cause the computerized apparatus to: obtain a plurality of images, the plurality of images configured to represent a panoramic image; map the plurality of images into a spherical collection of images; re-orient the spherical collection of images in accordance with a desired stitch line for a desired projection; and map the spherical collection of images into the desired projection comprising the desired stitch line.

In a seventh aspect of the present disclosure, a method of generating a selected projection of a spherical image is disclosed. In one embodiment, the method includes obtaining a plurality of images; mapping the plurality of images onto a spherical image; re-orienting the spherical image in accordance with a desired stitch line and a desired projection for the desired stitch line; and mapping the spherical image to the desired projection having the desired stitch line.

In one variant, the method further includes mapping the spherical image onto a plurality of differing desired projections.

In another variant, the method further includes selecting one of the plurality of differing desired projections and causing the display of a region of interest for the spherical image in accordance with the selected one of the plurality of differing desired projections.

In yet another variant, the selection of the one of the plurality of differing desired projections is based upon using a bandwidth consideration for the transmission of at least a portion of the selected one of the plurality of differing desired projections.

In yet another variant, the selection of the one of the plurality of differing desired projections is based upon using a storage consideration for at least a portion of the selected one of the plurality of differing desired projections.

In an eighth aspect of the present disclosure, a non-transitory computer-readable apparatus comprising a storage apparatus, the storage apparatus comprising instructions configured to, when executed by a processor apparatus, cause a computerized apparatus to determine a placement of a stitch line for a prescribed image projection, adjust, according to the determined placement of the stitch line, an orientation of a plurality of spherical images derived from a plurality of fisheye images and correlate the adjusted plurality of spherical images to the prescribed image projection, where the stitch line is located along a meridian plane associated with the plurality of spherical images.

In one variant, the instructions are further configured to, when executed by the processor apparatus, cause a computerized apparatus to obtain the plurality of fisheye images captured via a plurality of image-capturing elements, the plurality of fisheye images comprising hyper-hemispherical images, the hyper-hemispherical images each having a field of view of greater than 180 degrees and being associated with one or more overlap areas, the one or more overlap areas configured to reduce discontinuity within the cubic projection.

In another variant, the derivation of the plurality of spherical images from the plurality of fisheye images comprises a mapping of a plurality of pixels associated with the plurality of fisheye images based on a Cartesian coordinate system or a spherical coordinate system.

In yet another variant, the instructions are further configured to, when executed by the processor apparatus, cause a computerized apparatus to select the prescribed image projection from a plurality of projections; and wherein the selected prescribed image projection comprises a cubic projection.

In yet another variant, the instructions are further configured to, when executed by the processor apparatus, cause a computerized apparatus to select the prescribed image projection from a plurality of projections; and wherein the selected prescribed image projection comprises an octahedron projection.

In yet another variant, the prescribed image projection comprises a plurality of image facets, and the stitch line traverses a plurality of contiguous ones of the plurality of image facets.

In a ninth aspect of the present disclosure, a non-transitory computer-readable apparatus comprising a storage apparatus, the storage apparatus comprising instructions configured to, when executed by a processor apparatus, cause a computerized apparatus to determine a stitch line in an optimal stitch zone for a spherical image, adjust, according to the determined stitch line, an orientation of the spherical image, and generate, based at least on the spherical image, a projection having the determined stitch line.

In one variant, the instructions are further configured to, when executed by the processor apparatus, cause a computerized apparatus to obtain a plurality of fisheye images captured via a plurality of image-capturing elements, the plurality of fisheye images comprising hyper-hemispherical images, the hyper-hemispherical images each having a field of view of greater than 180 degrees and being associated with one or more overlap areas, the one or more overlap areas configured to reduce discontinuity within the projection and stitch the plurality of fisheye images based on the one or more overlap areas to generate the spherical image.

In another variant, the instructions are further configured to, when executed by the processor apparatus, cause a computerized apparatus to derive a spherical image from a plurality of fisheye images, captured via a plurality of image-capturing elements, by mapping of a plurality of pixels associated with the plurality of fisheye images based on a Cartesian coordinate system or a spherical coordinate system.

In yet another variant, the instructions are further configured to, when executed by the processor apparatus, cause a computerized apparatus to select the projection from a plurality of projections, wherein the selected projection is a cubic projection.

In yet another variant, the instructions are further configured to, when executed by the processor apparatus, cause a computerized apparatus to select the projection from a plurality of projections, wherein the selected projection comprises an octahedron projection.

In yet another variant, the projection comprises a plurality of image facets, and the stitch line traverses a plurality of contiguous ones of the plurality of image facets.

In yet another variant, the stitch line is located along a meridian plane associated with the spherical image.

In a tenth aspect of the present disclosure, a method of generating an image projection, the method comprising identifying a stitch line associated with an equatorial area of a plurality of spherical images, re-orienting the plurality of spherical images in accordance with the stitch line, and projecting the re-oriented plurality of spherical images to a selected image projection type.

In one variant, the method further includes obtaining image data via at least first and second image-capture apparatus, the first and second image-capture apparatus each configured to capture at least hemispherical images having a field of view that exceeds 180 degrees, and mapping at least a portion of the obtained image data onto the plurality of spherical images.

In another variant, the method further includes obtaining image data via at least first, second, and third image-capture apparatus, the first and second image-capture apparatus each configured to capture at least hemispherical images having a field of view that exceeds 120 degrees and mapping at least a portion of the obtained image data onto the plurality of spherical images.

In yet another variant, the projecting further includes mapping of the re-oriented plurality of spherical images to the selected image projection type.

In yet another variant, the selected image projection type is a cubic image projection, the method further includes selecting the image projection type based on at least one of (i) a compression efficiency, or (ii) bandwidth associated with transfer of the cubic image projection.

In yet another variant, the selected image projection type is a cubic image projection and the cubic image projection comprises a plurality of facets, the method further includes rotating at least one facet of the cubic image projection and arranging the rotated at least one facet with respect to at least one other facet of the plurality of facets so as to create congruency between a portion of the stitch line associated with the at least one facet and a portion of the stitch line associated with the at least one other facet.

In yet another variant, the stitch line is located along a meridian plane associated with the plurality of spherical images.

Other features and advantages of the present disclosure will immediately be recognized by persons of ordinary skill in the art with reference to the attached drawings and detailed description of exemplary implementations as given below.

All Figures disclosed herein are © Copyright 2015-2022 GoPro, Inc. All rights reserved.

DETAILED DESCRIPTION

Implementations of the present technology will now be described in detail with reference to the drawings, which are provided as illustrative examples and species of broader genuses so as to enable those skilled in the art to practice the technology. Notably, the figures and examples below are not meant to limit the scope of the present disclosure to any single implementation or implementation, but other implementations are possible by way of interchange of, substitution of, or combination with some or all of the described or illustrated elements. Wherever convenient, the same reference numbers will be used throughout the drawings to refer to same or like parts.

Moreover, while implementations described herein are primarily discussed in the context of spherical images that are captured using a spherical camera system having two (2) cameras (e.g., a front-facing and a rear-facing camera), it is readily appreciated that the principles described herein can be equally applied to other camera configurations. For example, when obtaining panoramic (e.g., 360°) content, three or more images from three or more cameras may be combined (stitched). Additionally, while primarily discussed in the context of camera configurations in which each of the centers of view for the respective cameras reside on a given two-dimensional plane, it is readily appreciated that one or more of these cameras can reside such that their center of view is focused at an azimuthal angle (e.g., at 45°), with respect to the given two-dimensional plane for other one(s) of the cameras. These and other variations would be readily apparent to one of ordinary skill given the contents of the present disclosure.

Example Image Capturing System

Figure 1:
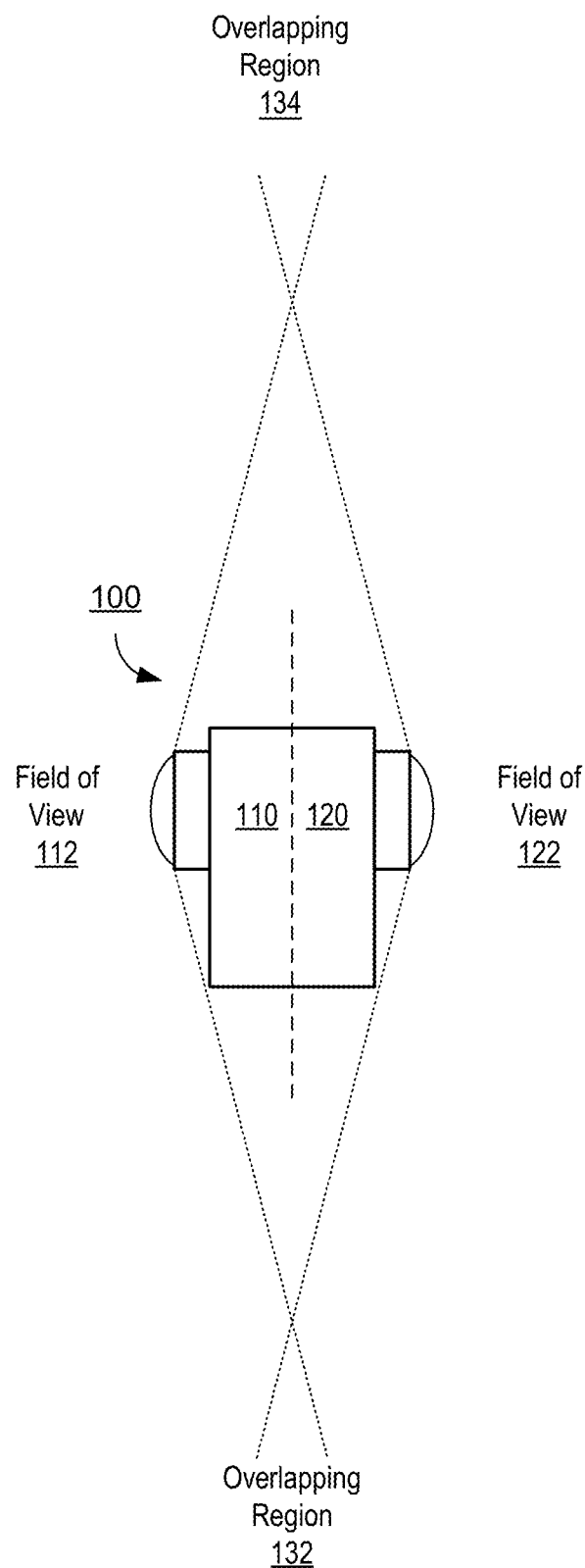
FIG. 1 is a block diagram of one exemplary spherical camera system, in accordance with the principles of the present disclosure.

FIG. 1 illustrates an embodiment of an example spherical camera system 100 that may include a first camera 110 capturing a first field of view 112 and a second camera 120 capturing a second field of view 122. In one or more implementations, the cameras 110, 120 may be integrated in a back-to-back configuration in which cameras 110, 120 face opposite directions. For example, in operation, the first camera 110 may be a "front-facing" camera 110 such that a user may point towards an object or scene of interest and the second camera 120 may be a "rear-facing" camera facing in an opposite direction of the front-facing camera 110. While the designations of front-facing and rear-facing are useful in describing the example processes described herein, these designations are arbitrary and the camera system 100 may operate in any orientation. The fields of view 112, 122 may each comprise a hyper-hemispherical field of view that captures slightly greater than a 180° range in at least one direction. Because the respective fields of view 112, 122 are hyper-hemispherical (e.g., greater than 180°), they overlap in overlapping regions 132, 134 near their respective boundaries. For example, the fields of view 112, 122 may overlap by n degrees (e.g., where n equals 1°, 5°, 10° or other various degrees of field of view overlap between, for example, a front-facing and rear-facing camera). These overlapping regions 132, 134 may be used for the stitching of these separately captured images obtained by the respective cameras 110, 120, as will be described in further detail below.

Additionally, it will be appreciated that in certain camera configurations that contain three (or more) cameras, the field of views for these cameras don't necessarily have to be hyper-hemispherical (i.e., greater than 180°). For example, in an implementation that utilizes three cameras, each of these cameras may capture an image that has a field of view that is greater than a 120° range in at least one direction, so that the resultant images may be stitched together into a full 360° field of view. These and other implementations would be readily apparent to one of ordinary skill given the contents of the present disclosure.

Exemplary Projection Methodologies—

The processes described herein may be performed by a video processing system comprising at least one processor and a non-transitory computer-readable storage apparatus having a storage medium. The storage medium stores a number of computer-executable instructions thereon, that when executed by the at least one processor, cause the at least one processor to perform the processes described herein. In an embodiment, the video processing system may be partially or wholly implemented in the camera 100 or may be implemented partially or wholly in an external device (e.g., in a computing device that is separate from the camera system 100 that obtained the resultant images). The various projection methodologies described herein are useful in, for example, the compression, storage and/or transmission of this captured video data.

Figure 2A:
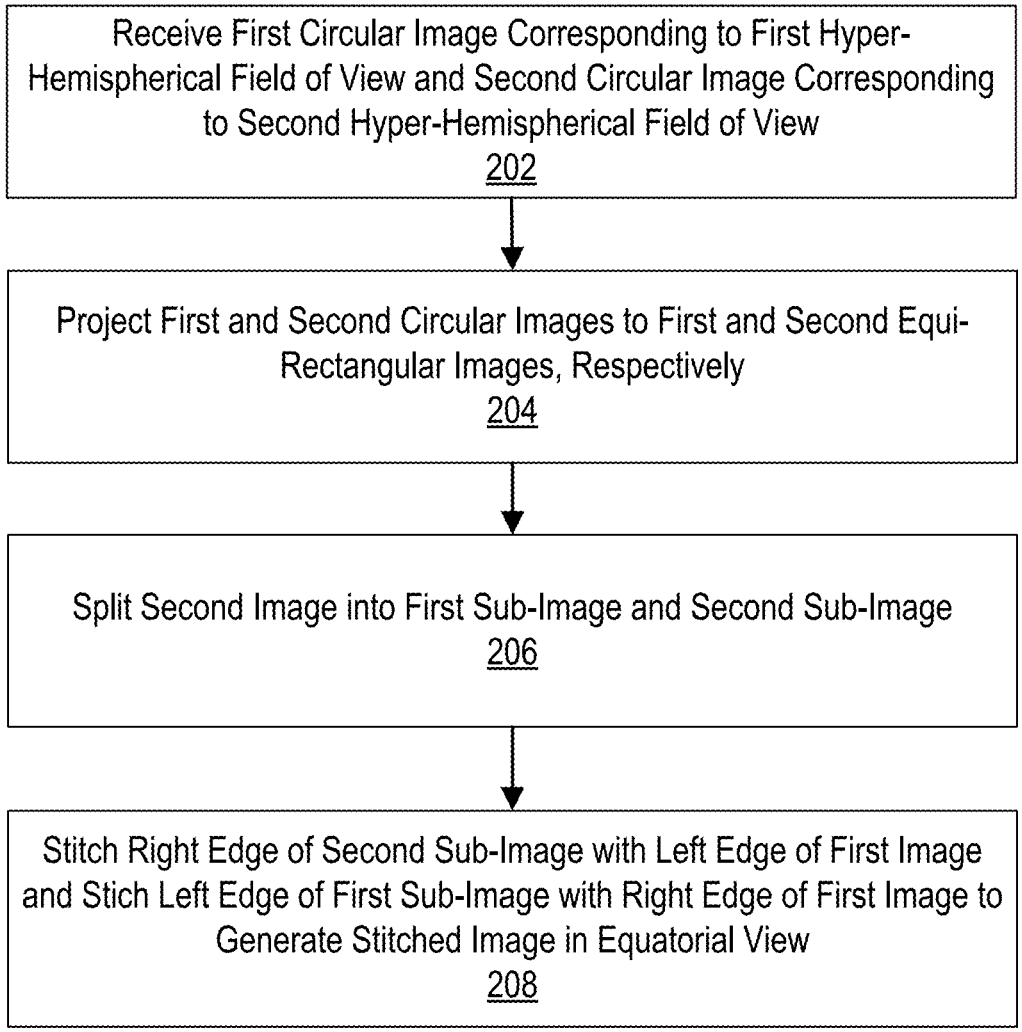
FIG. 2A is a logical flow diagram of an exemplary method for generating a rectangular projection of a spherical image, in accordance with the principles of the present disclosure.
Figure 2B:
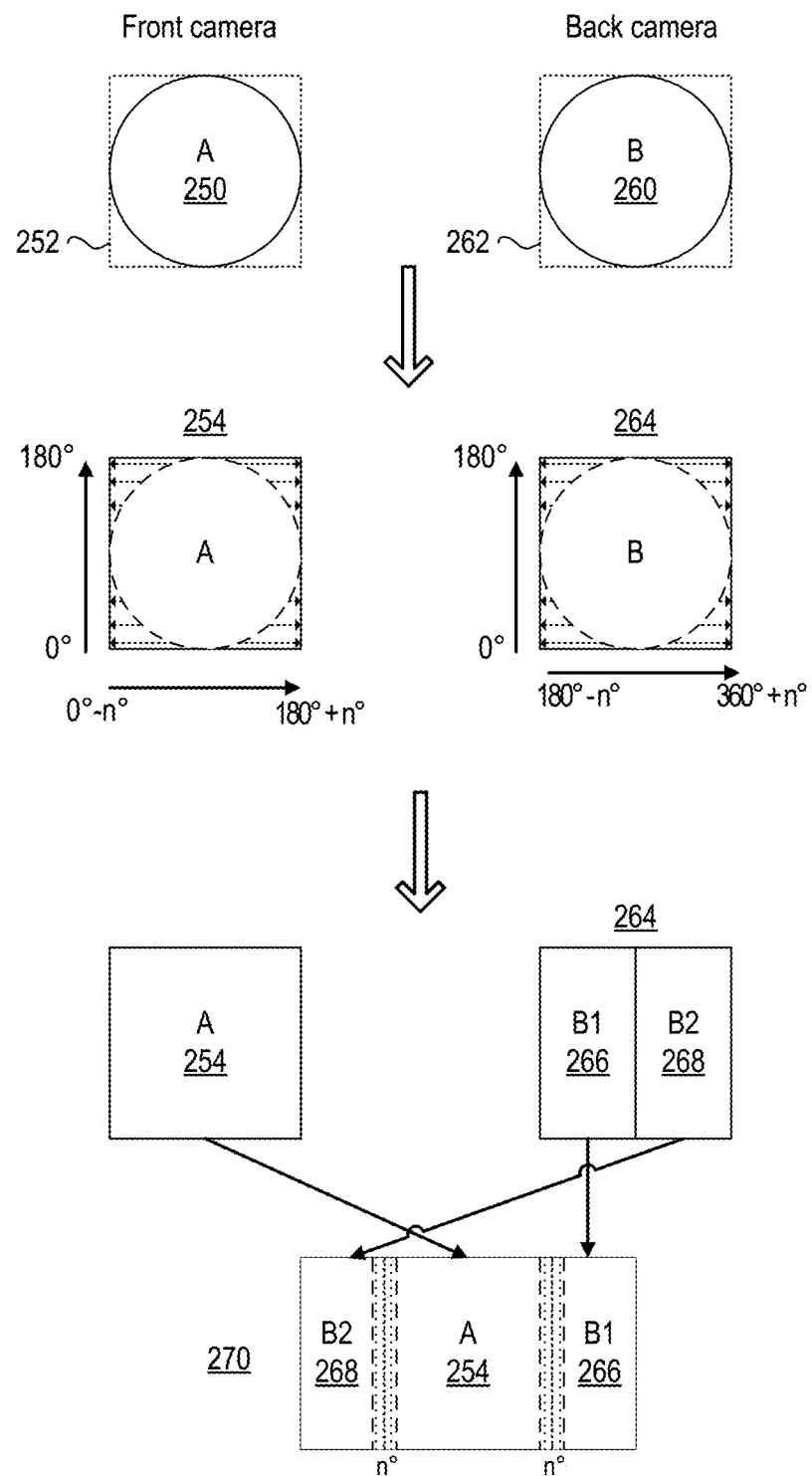
FIG. 2B is a sequence of images resulting from the exemplary methodology of FIG. 2A, in accordance with the principles of the present disclosure.

FIG. 2A illustrates a first embodiment of a process for stitching images captured by a spherical camera system 100 where the stitching zone runs along a meridian zone of the spherical image, while FIG. 2B illustrates example images resulting from the process of FIG. 2A. FIGS. 2A and 2B are described together for clarity and convenience.

Referring now to FIG. 2A, at step 202, an image sensor receives a first circular image corresponding to a first hyper-hemispherical field of view and a second circular image corresponding to a second hyper-hemispherical field of view. For example, as shown in FIG. 2B, a first circular image (e.g., image "A") 250 and a second circular image (e.g., image "B") 260 may be received at a video processing system. The first circular image 250 may represent, for example, the field of view captured by a first camera 110 (e.g., a front-facing camera) of a spherical camera system 100 and the second circular image 260 may represent, for example, the field of view captured by the second camera 120 (e.g., a rear-facing camera) of a spherical camera system 100. The images 250, 260 are circular because they represent the entire fields of view as seen by the respective cameras 110, 120 as opposed to a cropped rectangular field of view captured by a traditional camera. In an embodiment, the circular images 250, 260 may be captured by using only a circular region of a respective square or rectangular image sensor 252, 262. Alternatively, the circular images 250, 260 may be captured using respective circular image sensors. The circular images 250, 260 may each represent a hyper-hemispherical field of view (e.g., n degrees greater than a hemisphere in at least one direction (referenced supra)). Thus there may be overlap in the respective fields of view near the edges of the respective images 250, 260. This overlap may be used to align features present within both of these images for the later stitching of these images as will be described in further detail below.

The first circular image 250 and the second circular image 260 may be projected to a first equirectangular image 254 and a second equirectangular image 264 respectively, using equirectangular projections at step 204 of FIG. 2A. In these projections, the circular images 250, 260 may each be stretched horizontally to fill a square. As a result of this projection, the equirectangular images 254, 264 may become increasingly more distorted as the top and bottom edges are approached. For example, the center row of pixels may not undergo any stretching during the equirectangular projection processing, while the top and bottom row in the original circular image (which may each be represented by a respective single pixel) may be stretched to fill the entire top and bottom rows respectively of the equirectangular projections 254, 264. The resulting equirectangular images 254, 264 each may comprise an image representing a 180 degree (or a 180+2n) field of view along the vertical axis and represent a 180+2n degree field of view along the horizontal axis, where n represents the degree of overlap between the respective fields of view of the original images 250, 260. For example, the first equirectangular image 254 may comprise a field of view in the range of 0–n degrees to 180+n degrees and the second equirectangular image 264 may comprise a field of view in the range of 180–n degrees to 360+n degrees along the horizontal axis.

As a brief aside, the distortion introduced at the top and bottom of the respective images 254, 264 is primarily introduced as a result of the projection from a spherical image onto an equirectangular image. Although ultra wide-angle lens (e.g., a so-called fisheye lens) introduces a characteristic distortion into the captured image, this characteristic distortion can be subsequently removed from the generated spherical image as a result of the fact that this characteristic distortion is generally known (i.e., fixed within a reasonable degree of accuracy) when using an ultra wide-angle lens of appreciable quality.

Referring back to FIGS. 2A and 2B, the second image 264 may then be split at step 206 into a first sub-image 266 (e.g., a left sub-image) and a second sub-image 268 (e.g., a right sub-image). For example, the second image 264 may be divided vertically into two equal-sized sub-images 266, 268 in which the left sub-image 266 may represent the field of view 180–n degrees to 270 degrees and the right sub-image 268 may represent the field of view 270 degrees to 360+n degrees.

The left sub-image 266 may then be stitched at step 208 to the right side of the first image 254 (e.g., by aligning one or more features appearing in the n overlapping degrees near the left edge of the left-sub-image 266 with the one or more features in the n overlapping degrees near the right edge of the first image 254), and the right sub-image 268 may be stitched 208 to the left side of the first image 254 (e.g., by aligning one or more features appearing in the n overlapping degrees near the right edge of the right-sub-image 268 with the one or more features in the n overlapping degrees near the left edge of the first image 254). The resulting image 270 (referred to herein as an "equatorial view" of the spherical image) provides a useful equirectangular projection of the spherical field of view in which the center portion of the image 270 corresponds to the image 250 captured by the front-facing camera 110 and the left and right edges of the image 270 may correspond to the image 260 captured by the rear-facing camera 120. This orientation of the spherical image may be useful because many existing viewing and editing applications for spherical images assume that an image is received in this orientation.

An advantage of the method of FIGS. 2A-2B is that by projecting the spherical image to equirectangular images 254, 264 prior to stitching, a conventional stitching algorithm designed for rectangular images can be used without requiring a specialized stitching algorithm that operates directly in the spherical domain. However, a potential problem with the above-described process is that the top and bottom of the stitch lines in the stitched image 270 correspond to portions of the equirectangular images 254, 264 that may be subject to the greatest distortion from the equirectangular projection. This can lead to various errors in the stitching algorithm, which can result in undesirable artifacts near these top and bottom edges of the stitch lines.

Figure 3A:
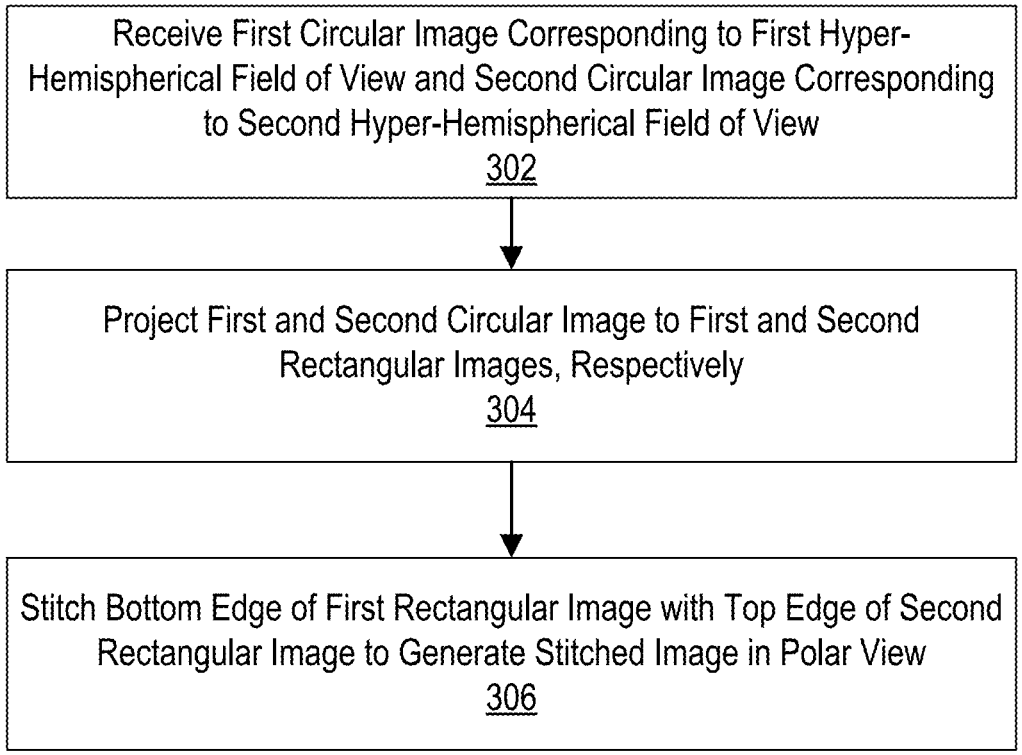
FIG. 3A is a logical flow diagram of another exemplary method for generating a rectangular projection of a spherical image, in accordance with the principles of the present disclosure.
Figure 3B:
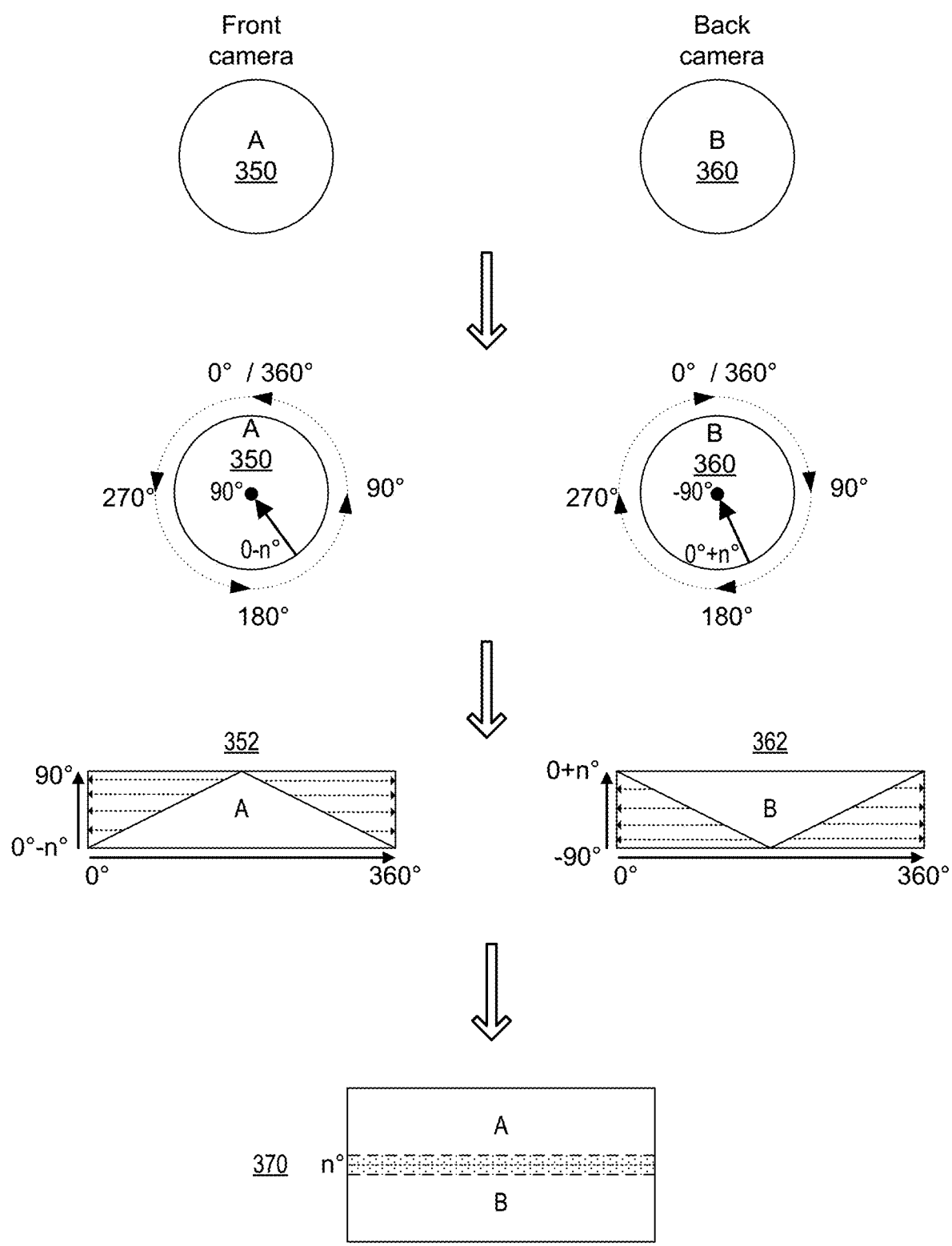
FIG. 3B is a sequence of images resulting from the exemplary methodology of FIG. 3A, in accordance with the principles of the present disclosure.

FIGS. 3A and 3B illustrate a second embodiment of a process for stitching images in a spherical camera system 100 where the stitching zone now runs along the equatorial zone of the spherical image (as opposed to the meridian zone as shown in FIGS. 2A and 2B), while FIG. 3B illustrates example images resulting from the process of FIG. 3A. In other words, the stitching methodology of FIG. 3A only utilizes a single stitch line. FIGS. 3A and 3B are described together for clarity and convenience.

A first circular image 350 and a second circular image 360 may be received at step 302 at a video processing system, which may be similar to the first circular image 250 and second circular image 260 respectively discussed above. The first circular image 350 and the second circular image 360 may be projected at step 304 to a first rectangular image 352 and a second rectangular image 362 respectively. Here, instead of using a conventional equirectangular projection, a projection may instead be used in which the outer edge of the circular image 350, 360 maps to a first horizontal edge of the rectangular image 352, 362 and a center point of the circular image 350, 360 maps to a second horizontal edge of the rectangular image 352, 362. Particularly, in the projection of the first circular image 350, the center point of the first circular image 350 maps to a top edge of the rectangular image 352 and the outer edge of the first circular image 350 maps to the bottom edge of the rectangular image 352. This projection may also be understood as taking increasing larger concentric rings of pixels from the circular image 350 and arranging them in rows (e.g., forming a triangle in which the center point represents the vertex of the triangle and the outer most ring represents the base of the triangle), which are then stretched to fill the rectangle. In this projection, the distortion in the rectangular image 352 due to stretching of the pixels increases near the top edge of the first rectangular image 352. Particularly, along the top edge, a single pixel (representing the center point of the original first circular image) may be stretched across the entire top edge, while along the bottom edge, no stretching may be performed. This may result in a rectangular image 352 representing a field of view from 0–n degrees to 90 degrees along the vertical axis (corresponding to the angles from the outer edge to the center point of the original circular image 350) and from 0 degrees to 360 degrees along the horizontal axis (corresponding to the angles around the circumference of the original circular image 350. In the projection of the second circular image 360, the center point of the second circular image 360 may be mapped to a bottom edge of the second rectangular image 362 and the outer edge of the second circular image 360 may be mapped to the top edge of the second rectangular image 360. Particularly, along the bottom edge of the second rectangular image 362, a single pixel (representing the center point of the original second circular image 360) may be stretched across the entire bottom edge, while along the top edge, no stretching may be performed.

The first rectangular image 352 and the second rectangular image 362 may then be stitched at step 306 together (e.g., by aligning the n overlapping degrees of the bottom edge of the first rectangular image 352 with the top edge of the second rectangular image 362). The resulting image 370 may be referred to as "polar view" of a spherical image. The stitch line may be referred to as an "equatorial stitch" because the stitched edges may correspond to an equator between the two hemispheres captured by the cameras 110, 120. As can be seen, in contrast to the stitching technique of FIGS. 2A-2B, only a single stitch line may be used and the stitch may be performed along edges of the images 352, 354 that have the least amount of distortion (e.g., no distortion) introduced from the rectangular projection. As a result, stitching artifacts caused by the projection distortion may be reduced or eliminated.

Figure 4A:
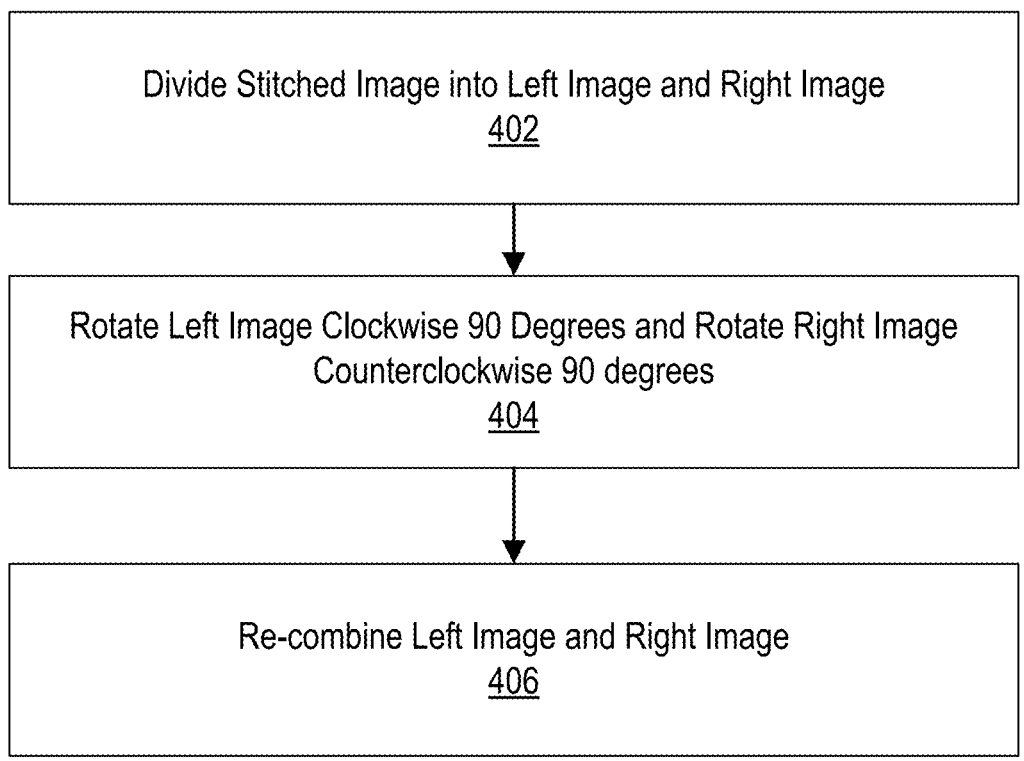
FIG. 4A is a logical flow diagram of an exemplary method for re-orienting a rectangular projection of a spherical image, in accordance with the principles of the present disclosure.
Figure 4B:
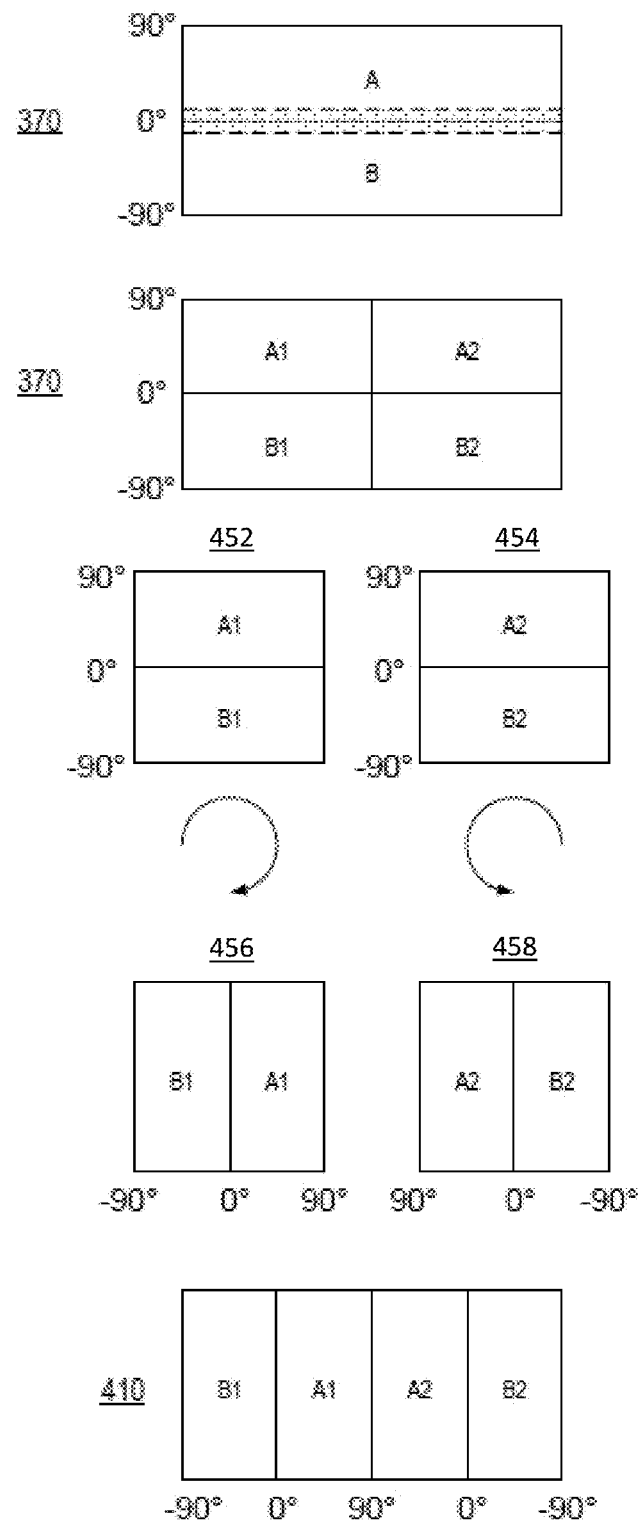
FIG. 4B is a sequence of images resulting from the exemplary methodology of FIG. 4A, in accordance with the principles of the present disclosure.

The resulting stitched image 370 in the polar view may be converted to the equatorial view of FIG. 2B, in which the center line of the front-facing camera 110 represents the center line of the image and the center of the rear-facing camera 120 represents the left and right edges. FIG. 4A illustrates a process for re-projecting the image from the polar view to the equatorial view. FIG. 4B illustrates example images resulting from this process. FIGS. 4A-4B are described together herein for clarity and convenience.

In this process, the stitched image 370 may be divided at step 402 into left and right equally sized sub-images 452, 454. The left sub-image 452 may be rotated at step 404 clockwise 90 degrees and the right sub-image 454 may be rotated 404 counterclockwise 90 degrees. The rotated left sub-image 456 and the rotated right sub-image 458 may be re-combined at step 406 (e.g., by aligning the right edge of the rotated left sub-image 406 with the left edge of the rotated right sub-image 408) to generate the re-orientated image 410. This re-orientation may be useful to enable the spherical image to be processed using the same editing or viewing tools designed for use with the projection of FIG. 2B.

Figure 5A:
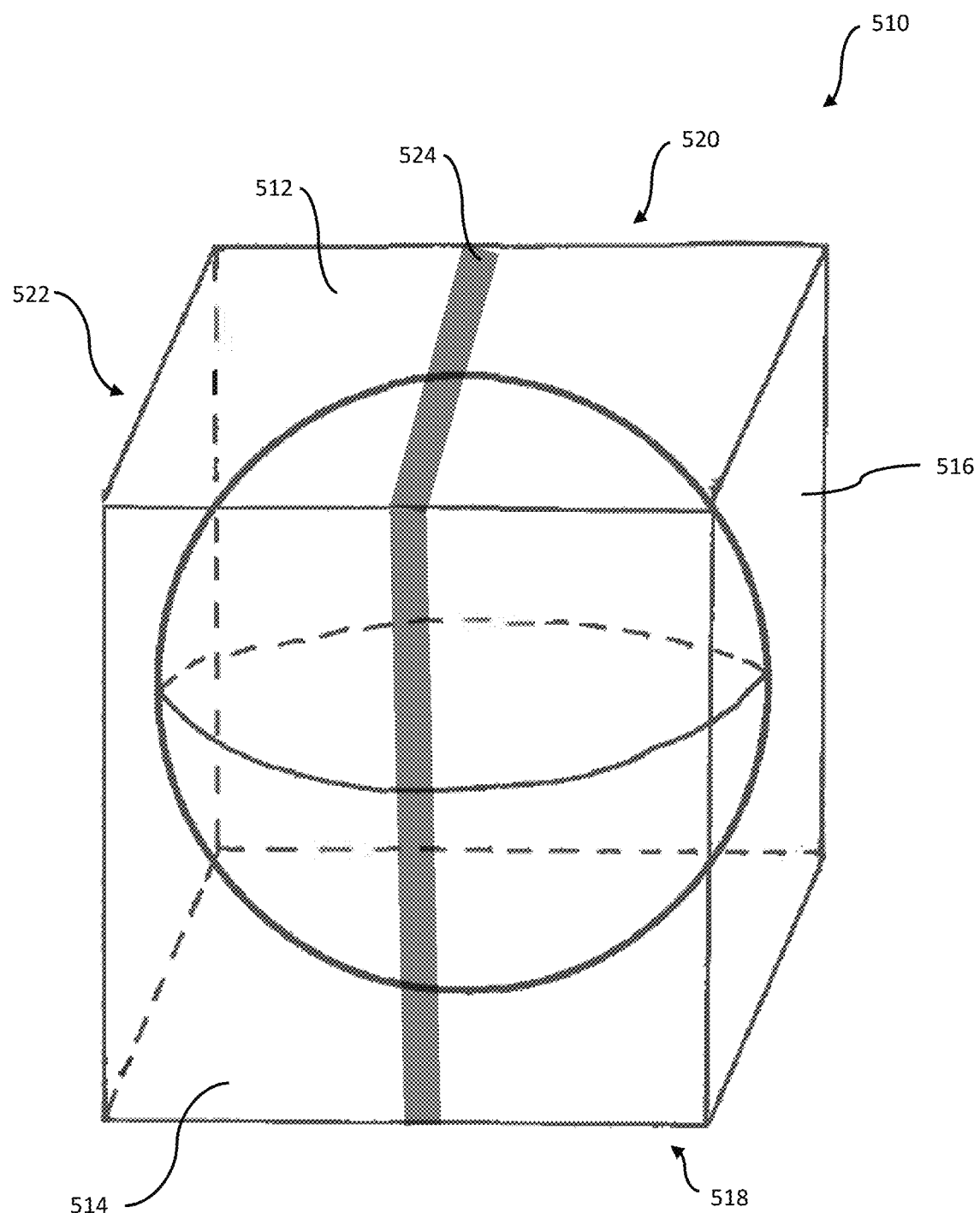
FIG. 5A is an isometric view of a cubic projection taken from a spherical image in which the stitch zone is placed on a meridian zone, in accordance with the principles of the present disclosure.
Figure 5B:
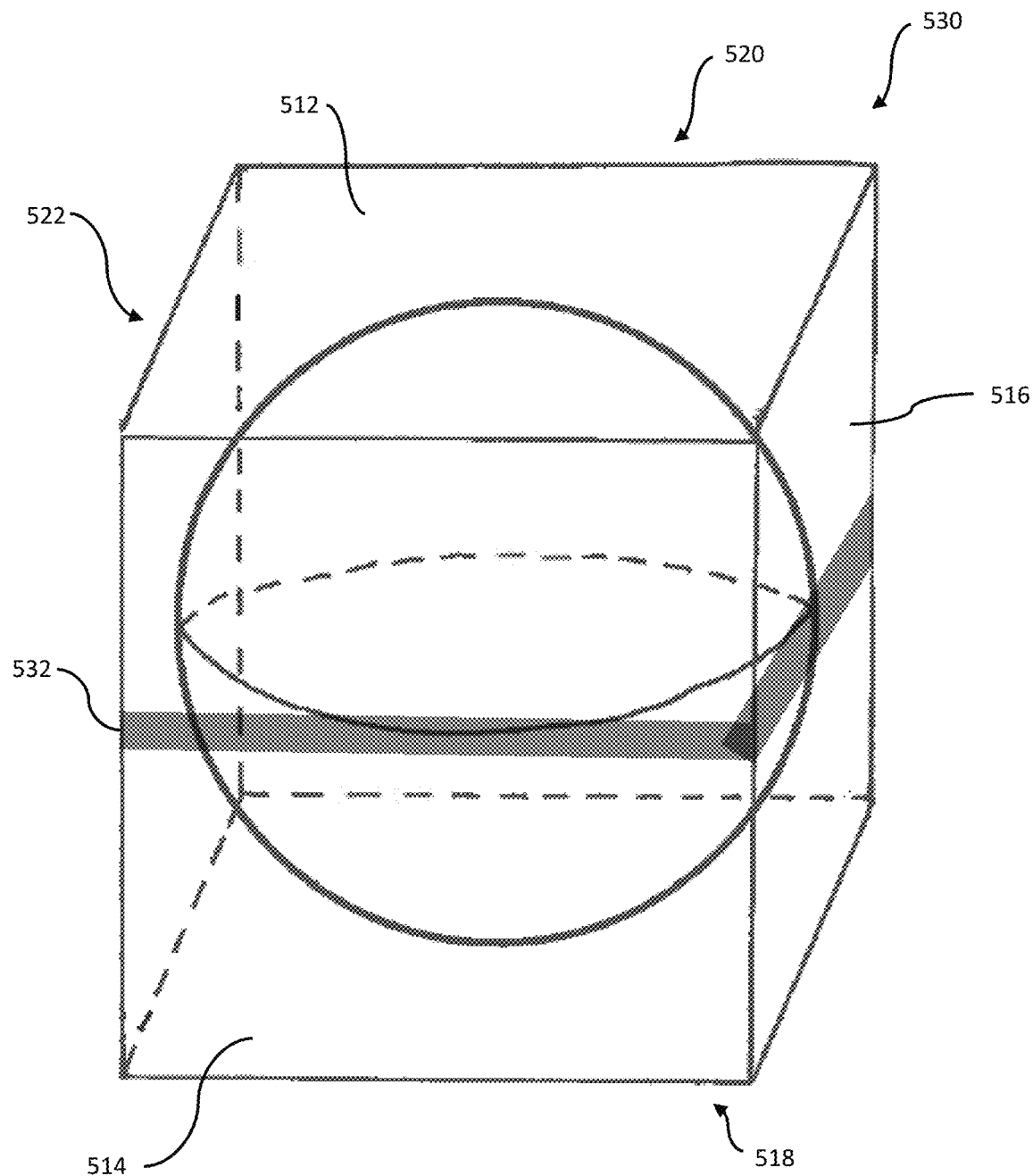
FIG. 5B is an isometric view of a cubic projection taken from a spherical image in which the stitch zone is placed on an equatorial zone, in accordance with the principles of the present disclosure.

Referring now to FIGS. 5A-5B, various methodologies for selecting the orientation of a stitching line for a generated cubic projection from a spherical image is shown and described in detail. Specifically, FIGS. 5A and 5B illustrate various ways in which these stitch lines may be generated in order to generate a desired cubic projection from a spherical image. Specifically, stitch zone 524, as shown in FIG. 5A, illustrates a stitch zone that runs along a meridian zone of the spherical image, while stitch zone 532 as shown in FIG. 5B illustrates a stitch zone that runs along the equatorial zone of the spherical image. As a brief aside, a so-called "optimal stitch zone" for any projection (e.g., an equirectangular projection as described with regards to FIGS. 2A-4B, a cubic projection as described with regards to FIGS. 5A-5D, an octahedron projection as will be described with regards to FIGS. 6A-6D, as well as various other polygonal shaped projections) may be defined as a set of points that defines a single line (or plane) in which the set of points along that projection lie closest to the spherical image in a mean square sense, while bisecting the spherical image in two equal halves.

For example, referring again to FIG. 5A, a cubic projection 510 of the spherical image is shown having six (6) faces. Specifically, cubic projection 510 includes a top face 512, a front face 514, a right face 516, a bottom face 518, a back face 520, and a left face 522. The stitch zone 524 may be characterized by its length, and compared with the circumference of the spherical image, in order to generally get a sense of the level of distortion introduced by the cubic projection. In the illustrated embodiment of FIG. 5A, if the spherical image has a radius dimension r, then the circumference for the spherical image will be 2πr in total length (or approximately 6.28 r). However, the total length of the stitching line on the cubic projection 510 is 8 r (i.e., the total combined length of the stitching line 524 on the front face 514, top face 512, back face 520 and bottom face 518).

Contrast the cubic projection 510 of FIG. 5A with the cubic projection 530 illustrated in FIG. 5B. Specifically, while cubic projection 530 also includes a top face 512, a front face 514, a right face 516, a bottom face 518, a back face 520, and a left face 522, the stitch line 532 now runs along the equatorial line of the spherical image. In other words, the stitch line 532 now runs along the front face 514, left face 522, back face 520, and right side face 516. Additionally, similar to the cubic projection 510 illustrated in FIG. 5A, the total length of the stitching line on the cubic projection 530 is 8 r (i.e., the total combined length of the stitching line 524 on the front face 514, left face 522, back face 520, and right face 516). Accordingly, when viewed as a whole, the level of distortion contained within the cubic projection 510 shown in FIG. 5A may generally possess an equivalent level of distortion contained within the cubic projection 530 as shown in FIG. 5B.

Figure 5C:
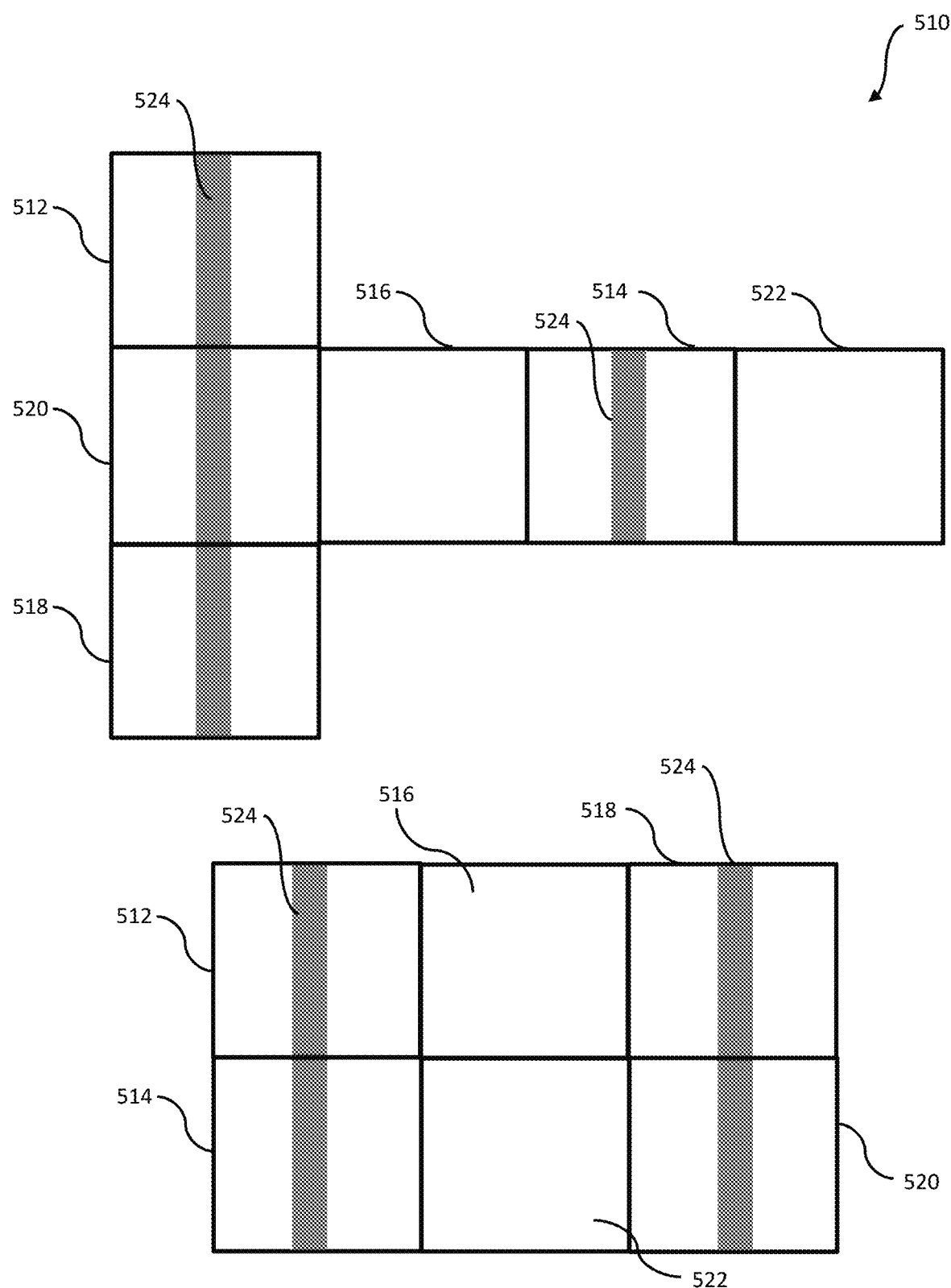
FIG. 5C is a logical plan view illustrating the mapping of the cubic projection of FIG. 5A into a sequence of frames suitable for storage and transmission, in accordance with the principles of the present disclosure.

FIG. 5C illustrates one such representation of a frame packing arrangement for the cubic projection generated in FIG. 5A. The top portion of FIG. 5C illustrates the logical unfolding of the cubic projection generated in FIG. 5A. Specifically, on the left hand-side of the top portion of FIG. 5C, the faces corresponding to the cubic projection generated in FIG. 5A include the back face 520, the top face 512, and the bottom face 518 with the stitching line 524 running down the middle of each of these faces. Immediately adjacent the back face 520, resides the right face 516, followed by the front face 514, and the left face 522. Note that due to the meridian zone nature of the stitching line 524 of FIG. 5A, the stitching line 524 also runs through the front face 524 of the cubic projection generated in FIG. 5A. The bottom portion of FIG. 5C illustrates one logical frame packing arrangement for the cubic projection generated in FIG. 5A. Specifically, the front face 514 has been rotated by 180° and placed underneath the top face 512 such that their respective stitching lines 524 have now been aligned. Similarly, the left face 522 has been rotated by 180° and logically placed underneath the right face 516, while the back face 520 has been rotated by 180° and logically placed underneath the bottom face 518 so that their respective stitching lines 524 have been aligned.

Figure 5D:
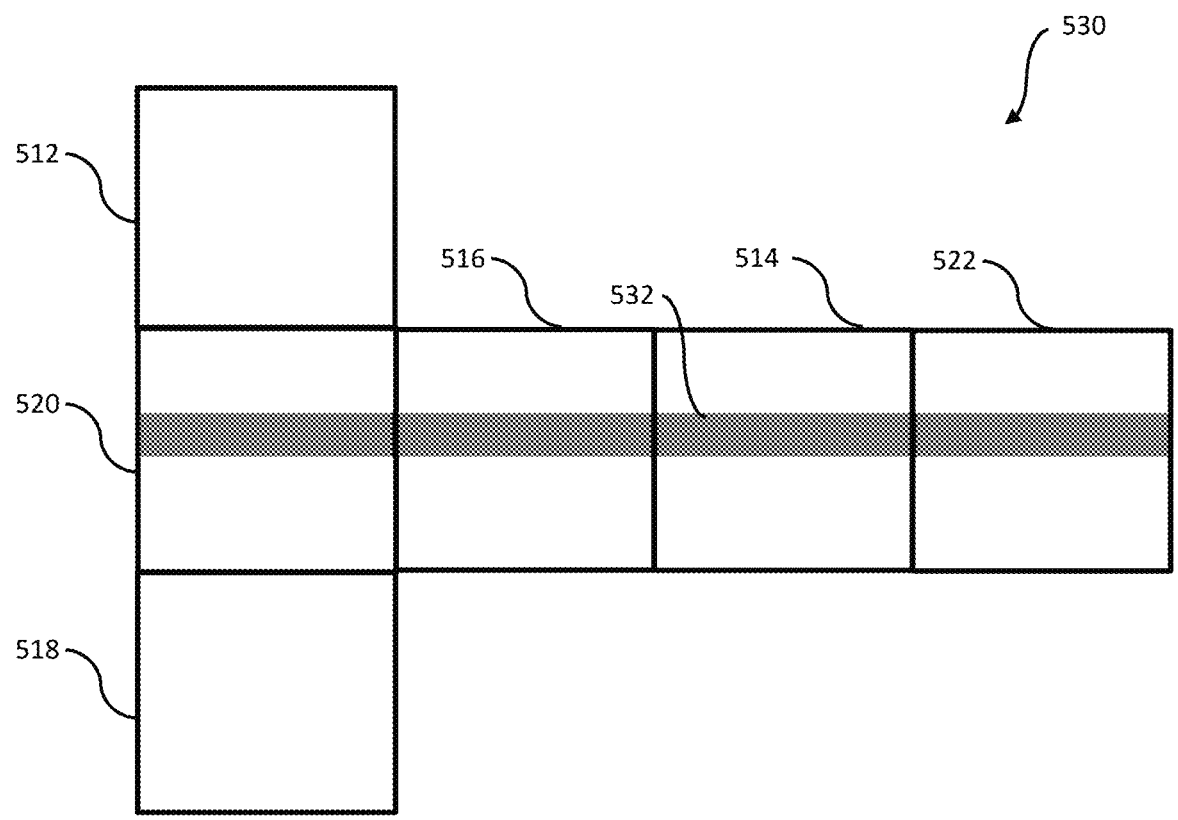
FIG. 5D is a logical plan view illustrating the mapping of the cubic projection of FIG. 5B into a sequence of frames suitable for storage and transmission, in accordance with the principles of the present disclosure.
Figure 5D:
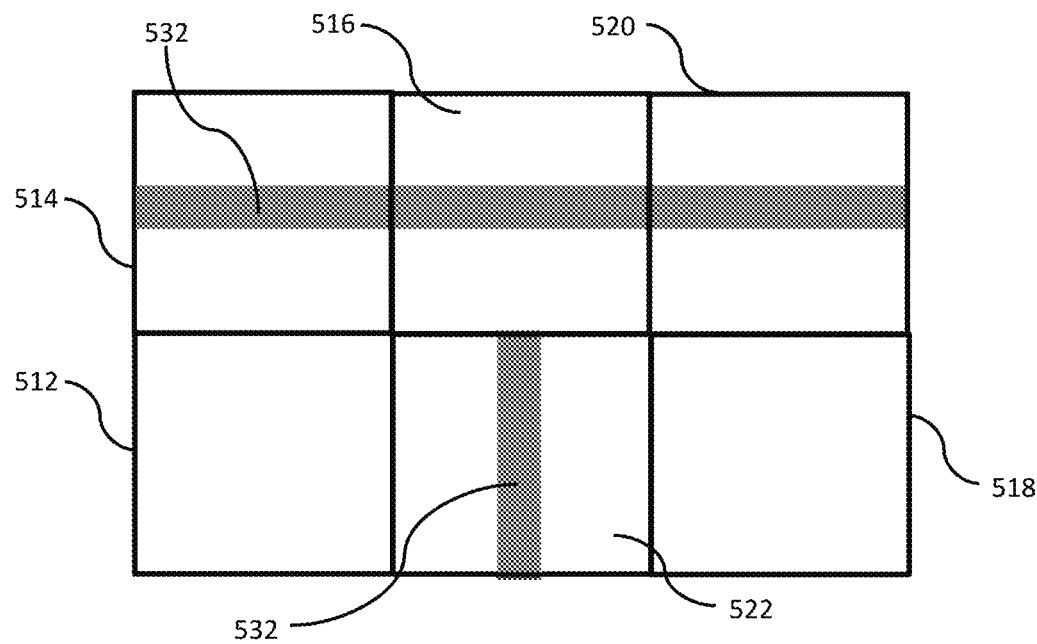

FIG. 5D illustrates one such representation of a frame packing arrangement for the cubic projection generated in FIG. 5B. Specifically, the arrangement of the faces as shown in the top portion of FIG. 5D is identical to that shown in the top portion of FIG. 5C; however, the arrangement of the stitching line 532 differs in that the stitching line runs along the equatorial zone of the cubic projection (i.e., through the middle of the back face 520, the middle of the right face 516, the middle of the front face 514, and the middle of the left face 522) as shown in FIG. 5B. The bottom portion of FIG. 5D illustrates one logical frame packing arrangement for the cubic projection generated in FIG. 5B. Specifically, the top row consists of the front face 514, the right face 516, and the back face 520, each having the stitching line 532 running there through. The bottom row consists of the top face 512, the left face 522, and the bottom face 518. The left face 522 also has the stitching line 532 running there through; however, the face 522 has been rotated by 90°. Accordingly, as is illustrated in FIGS. 5C and 5D, the selection of a differing stitch zone for a desired projection does not affect the ability to generate various frame packing arrangements for the imaging data.

Figure 6A:
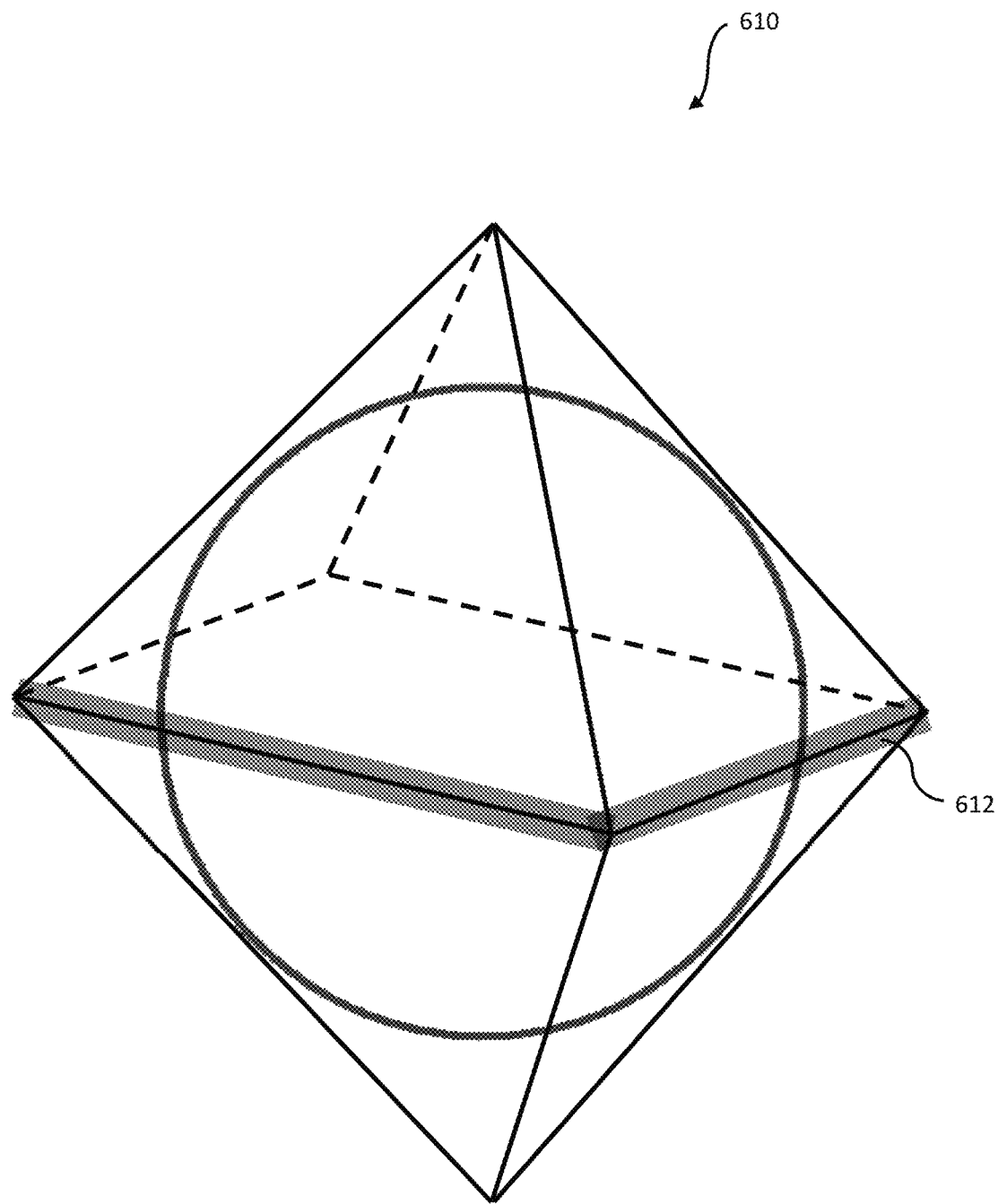
FIG. 6A is an isometric view of an octahedron projection taken from a spherical image in which the stitch zone is placed on an equatorial zone, in accordance with the principles of the present disclosure.
Figure 6B:
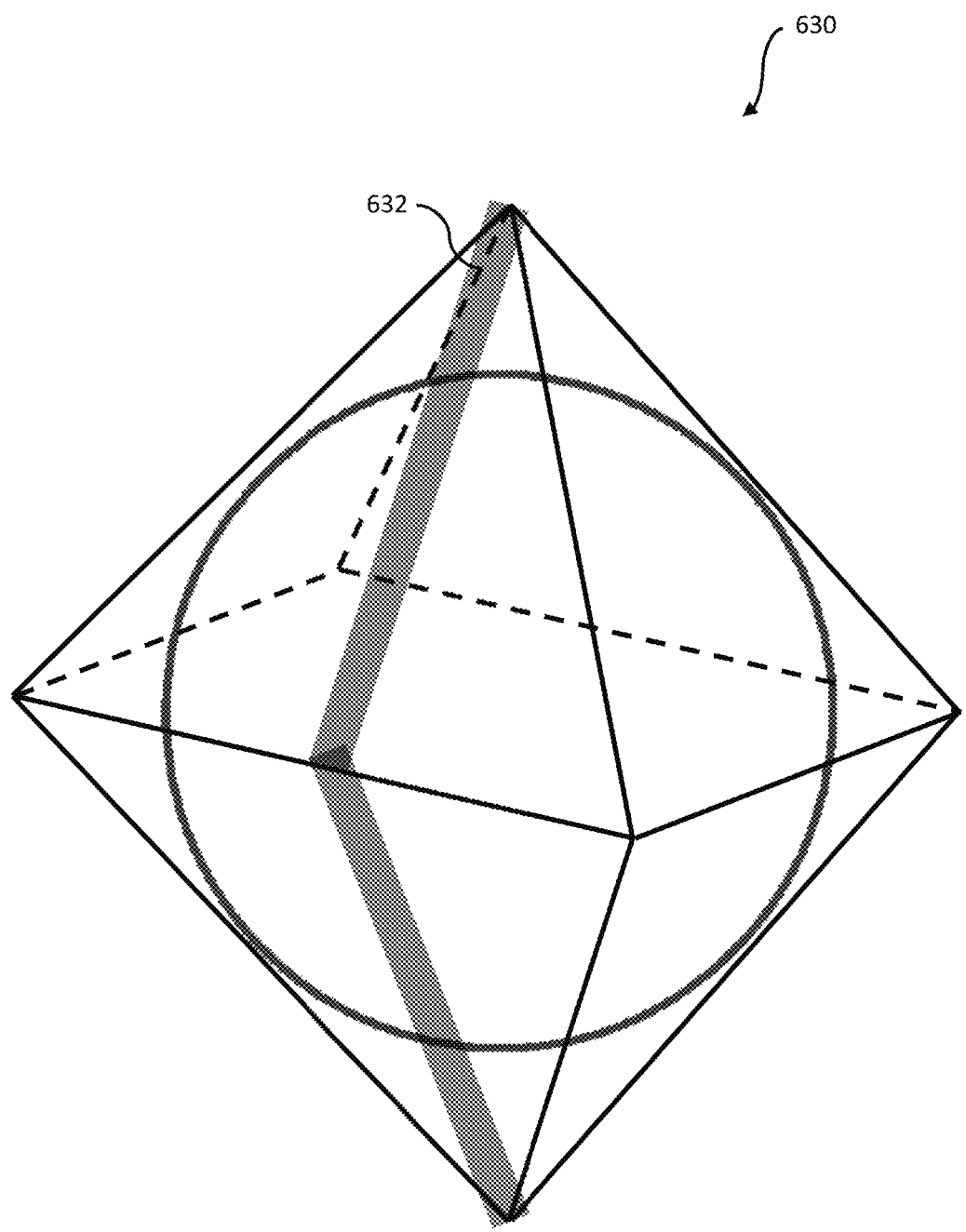
FIG. 6B is an isometric view of an octahedron projection taken from a spherical image in which the stitch zone is placed on a meridian zone, in accordance with the principles of the present disclosure.

Referring now to FIGS. 6A-6B, various methodologies for selecting the orientation of a stitching line for a generated octahedron projection from a spherical image is shown and described in detail. Specifically, FIGS. 6A and 6B illustrate various ways in which these stitch lines may be generated in order to generate a desired octahedron projection from a spherical image. Specifically, stitch zone 612 for octahedron projection 610 results in an equatorial stitch line in the configuration illustrated in FIG. 6A. Accordingly, the length of the stitch line illustrated in FIG. 6A may have a length of 8 r, when capturing a spherical image having a radial dimension r (similar to the cubic projections illustrated in FIGS. 5A and 5B).

FIG. 6B illustrates a meridian stitch zone 632 for the octahedron projection 630. The length of this meridian stitch zone 632 would have a total length of $4 r\sqrt{3}$ (i.e., approximately 6.9 r). Accordingly, the length of the meridian stitch zone 632 for the octahedron projection 630 illustrated in FIG. 6B would be shorter than the equatorial stitch zone 612 for the octahedron projection 610 illustrated in FIG. 6A. As a result, the meridian stitch zone 632 may be expected to have a lesser amount of distortion associated with it for the octahedron projection then the equatorial stitch zone 612 illustrated in FIG. 6A. In other words, by running the stitch line along the meridian in the octahedron projection of a spherical image may enable higher quality stitching (i.e., by placement of the stitching zone in an optimal stitch zone location). However, as was discussed with respect to FIGS. 5A and 5B, one may choose a theoretically less desirable stitch line location in order to, inter alia, introduce less distortion to an area of interest within the captured image data, while simultaneously introducing more distortion to other areas. Herein lies one salient advantage of the principles of the present disclosure. Namely, by enabling the selection of not only the desired projection (e.g., equirectangular, cubic, octahedron and other types of projections), but also the selection of a desired stitching zone, one may be able to optimize the arrangement of the captured spherical imaging content depending upon, for example, particular areas of interest within the captured image(s), reducing the number of operations associated with generating the desired projection (e.g., with equirectangular projections, running the stitch line along the equator involves rotation/remapping operations as discussed supra) and/or other considerations.

Figure 6C:
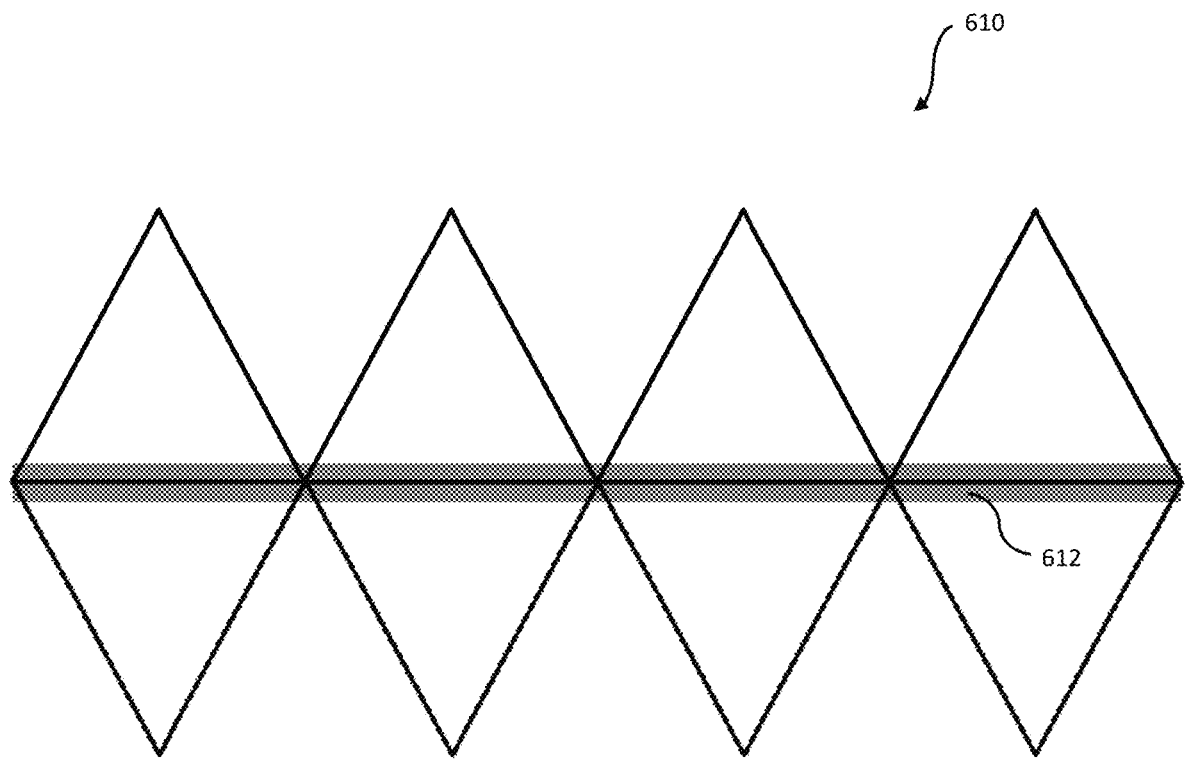
FIG. 6C is a logical plan view illustrating the mapping of the octahedron projection of FIG. 6A into a sequence of frames suitable for storage and transmission, in accordance with the principles of the present disclosure.
Figure 6D:
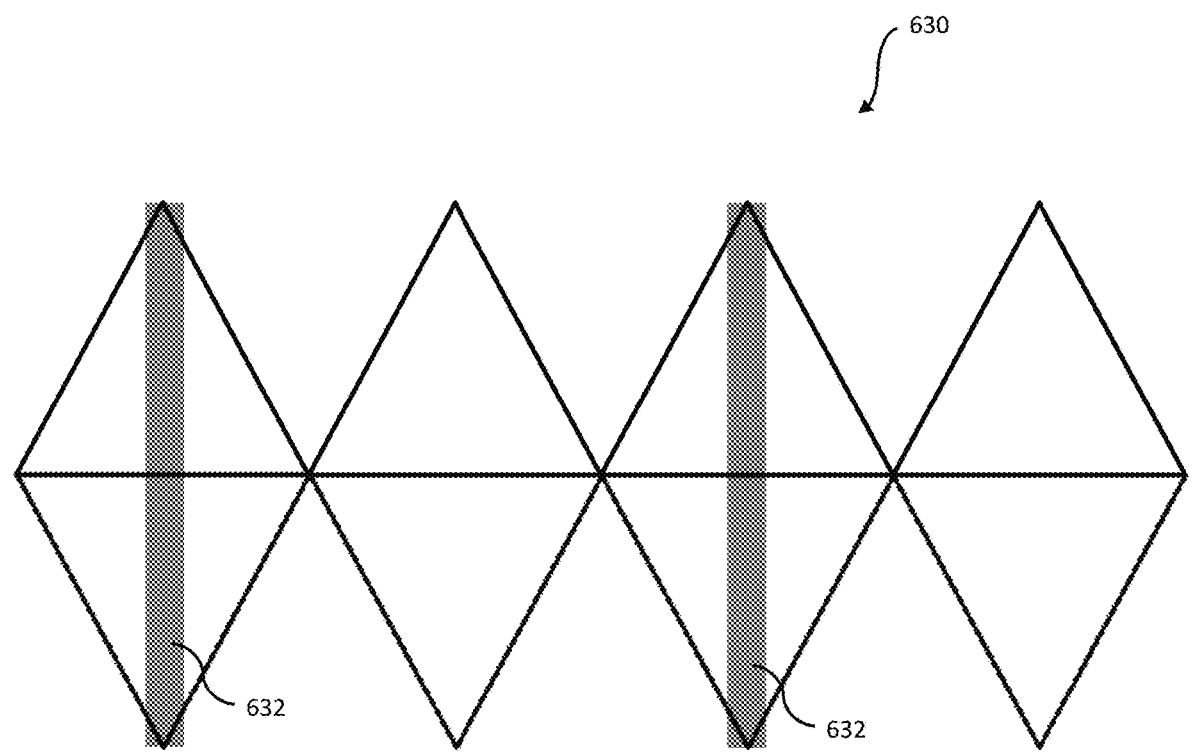
FIG. 6D is a logical plan view illustrating the mapping of the octahedron projection of FIG. 6B into a sequence of frames suitable for storage and transmission, in accordance with the principles of the present disclosure.

FIGS. 6C and 6D illustrate logical frame packing arrangements for the octahedron projections illustrated in FIGS. 6A and 6B, respectively. Specifically, FIG. 6C illustrates the placement of the stitch line 612 on the octahedron projection 610 as is illustrated in FIG. 6A, while FIG. 6D illustrates the placement of the stitch line 632 on the octahedron projection 630 of FIG. 6B. Accordingly, and as was previously discussed with respect to FIGS. 5C and 5D, the selection of a differing stitch zone for a desired projection does not affect the ability to generate various frame packing arrangements for the imaging data.

While the discussion above has been limited to equirectangular projections, cubic projections, and octahedron projections, it would be readily apparent to one of ordinary skill that the present disclosure is not so limited. In fact, the principles described herein may be readily applied to other polygon projections, such as convex regular polygon projections having a varying number of faces, including, without limitation tetrahedron polygons (having four such faces), dodecahedron polygons (having twelve such faces), and icosahedron polygons (having twenty such faces). Accordingly, by projecting a spherical image onto these various polygon projections and utilizing a stitching line placed on an optimal stitch zone (or other non-optimal stitch zones) one may take into consideration various factors such as, for example, introducing a least amount of distortion for these projected images, minimizing the level of distortion within a given area or given areas of interest and/or other considerations as would be readily understood by one or ordinary skill given the contents of the present disclosure.

Figure 7:
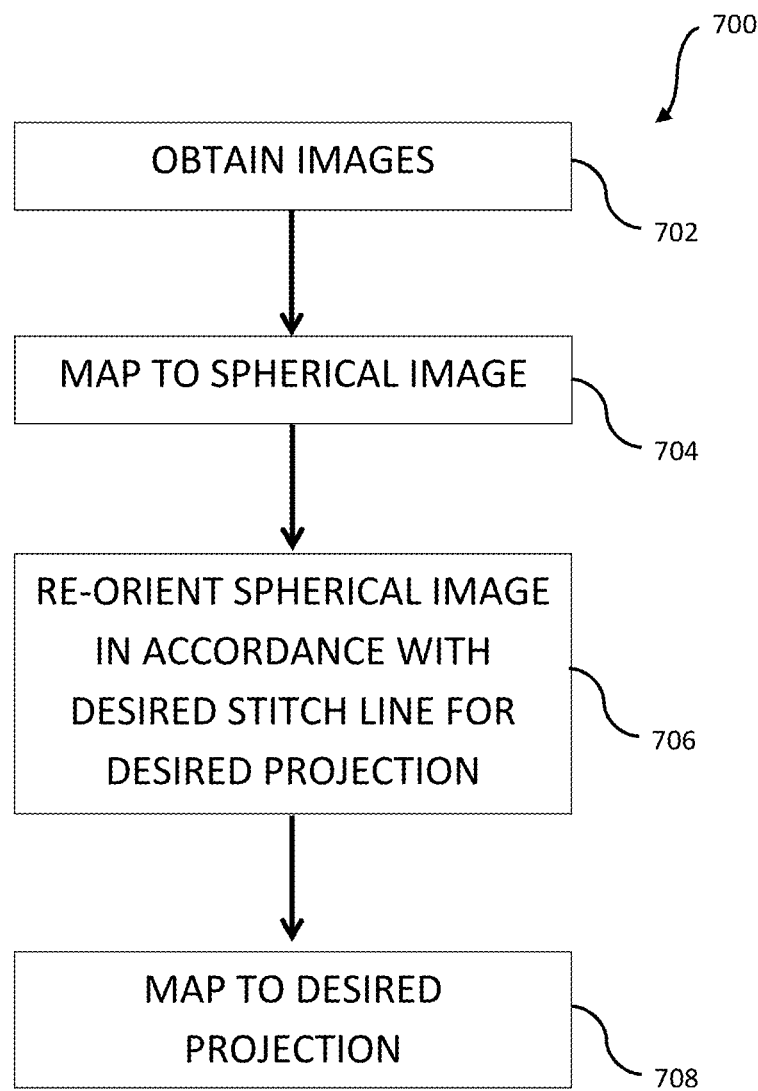
FIG. 7 is a logical flow diagram of an exemplary method for mapping a spherical image to a desired polygon-type projection, in accordance with the principles of the present disclosure.

Referring now to FIG. 7, an exemplary methodology 700 for the mapping of a captured spherical image onto a desired projection is shown and described in detail. At step 702, two or more images are obtained using, for example, the aforementioned spherical camera system 100. For example, in one or more implementations, a pair of fish eye camera lens images may be obtained using the aforementioned spherical camera system 100. Each of the pair of images may capture respective images having an overlapping field of view such that common feature(s) residing within each of these images may be mapped in order to later combine (stitch) these pair of images. In some implementations, the images may be obtained using three or more cameras that are offset with one another by, for example, 120° and/or by using one or more cameras with their fields of view arranged outside of the equatorial field of view of two or more other cameras within spherical camera system 100.

At step 704, the obtained images from step 702 may be mapped onto a spherical image of the collective field of views associated with the spherical camera system 100. In one or more implementations, individual pixels associated with the images captured at step 702 are mapped to a Cartesian coordinate system so that each of the pixels captured by the spherical camera system has an x-coordinate, y-coordinate, and a z-coordinate associated with it. Accordingly, these Cartesian coordinates may be used to re-orient the spherical image for placement of an optimal stitch zone at step 706. In some implementations, individual pixels associated with the images captured at step 702 are mapped in accordance with a spherical coordinate system. For example, in one or more implementations, the individual pixels will assumed to have a fixed radius r and accordingly, the spherical coordinate system will map the images according to a polar angle $\theta$, and an azimuth angle $\Phi$. In yet other implementations, each pixel captured at step 702 will be assigned a variable value r, in addition to being assigned a polar angle $\theta$, and an azimuth angle $\Phi$.

At step 706, the mapped spherical image obtained at step 704 is re-oriented in accordance with the desired placement of a stitch line on a desired projection. In some implementations, the placement of the stitch line may be placed in accordance with an optimal stitch zone for the desired projection. For example, where the desired projection is a cubic projection, the mapped spherical image will be re-oriented such that the stitch line is placed either on an equatorial plane of the spherical image, or on a meridian plane of the spherical image. In one or more implementations, where the desired projection is an octahedron projection, the mapped spherical image may be re-oriented such that, for example, the stitch line may be placed in an optimal stitch zone (i.e., such that the set of points that make up the stitching zone lies closest to the sphere in a means square sense, while bisecting the spherical image into two equal halves). Alternatively, the spherical image may be re-oriented such that the placement of the stitch line is optimal for reducing the level of distortion for an object of interest within the spherical image (e.g., a person, a face, a building, and/or other objects of interest), either taking (or not taking) the optimal stitch zone into consideration.

At step 708, the re-oriented spherical image of step 706, is mapped to a desired projection. Various considerations may be taken into consideration when choosing a desired projection. In one or more implementations, the desired projection may take into consideration bandwidth considerations for the transmission of the image data, For example, in one or more implementations some projections (such as, for example, the aforementioned cubic or octahedron projections) may compress more efficiently than other projections (such as, for example, the aforementioned equirectangular projection). This compression efficiency may be enhanced as a result of, for example, lesser distortion contained at the poles of the projected image. In some implementations, other considerations may be taken into account, additionally or alternatively to, the aforementioned bandwidth considerations (e.g., storage considerations for the display device, power considerations for the encoding/decoding of the projected images and/or other considerations).

Additionally, in one or more implementations, it may be desirable to map a given spherical image onto multiple projections. For example, in some implementations where a user may wish to "zoom in", or alternatively "zoom out", it may be desirable to select a desired projection for each of the zoomed in or zoomed out portions for the spherical image. In particular, choosing a relatively complex projection (such as e.g., an icosahedron projection) may be less desirable for a zoomed out image, as the field of view of interest may result in the introduction of distortion as a result of having to cross multiple face boundaries on the desired projection of the area of interest. Conversely, when looking at a zoomed in portion of the image, a relatively complex projection may be more desirable as the field of view of interest may not cross any face boundaries (or may cross relatively few facial boundaries) on the relatively complex projection. As a brief aside, face boundaries on a desired polygon projection are prone to artifacts as a result of, for example, an encoder encoding different faces in separate instances and as a result having to make differing quantization parameter (QP)/mode decisions. Accordingly, in some implementations it may be desirable to select three or more projections based on, for example, the number of face boundaries that need to be crossed within a desired field of view. As a brief aside, another reason for selecting a projection that has a fewer number faces may be to reduce the transmission bit rate for the projected image. For example, when encoding faces, one may have to encode a slight overlap region between the faces in order to, inter alia, reduce discontinuities (especially when dealing with relatively large QP values). Accordingly, these overlapping regions can increase the bit rate of the transmitted projection as compared with a projection that has a fewer number of faces. For example, a 0.5% increase in overlap area may introduce a 1.7% increase in the bit rate necessary to transmit this projection. These and other variations would be readily appreciated and apparent to one of ordinary skill given the contents of the present disclosure.

Exemplary Apparatus—

Figure 8:
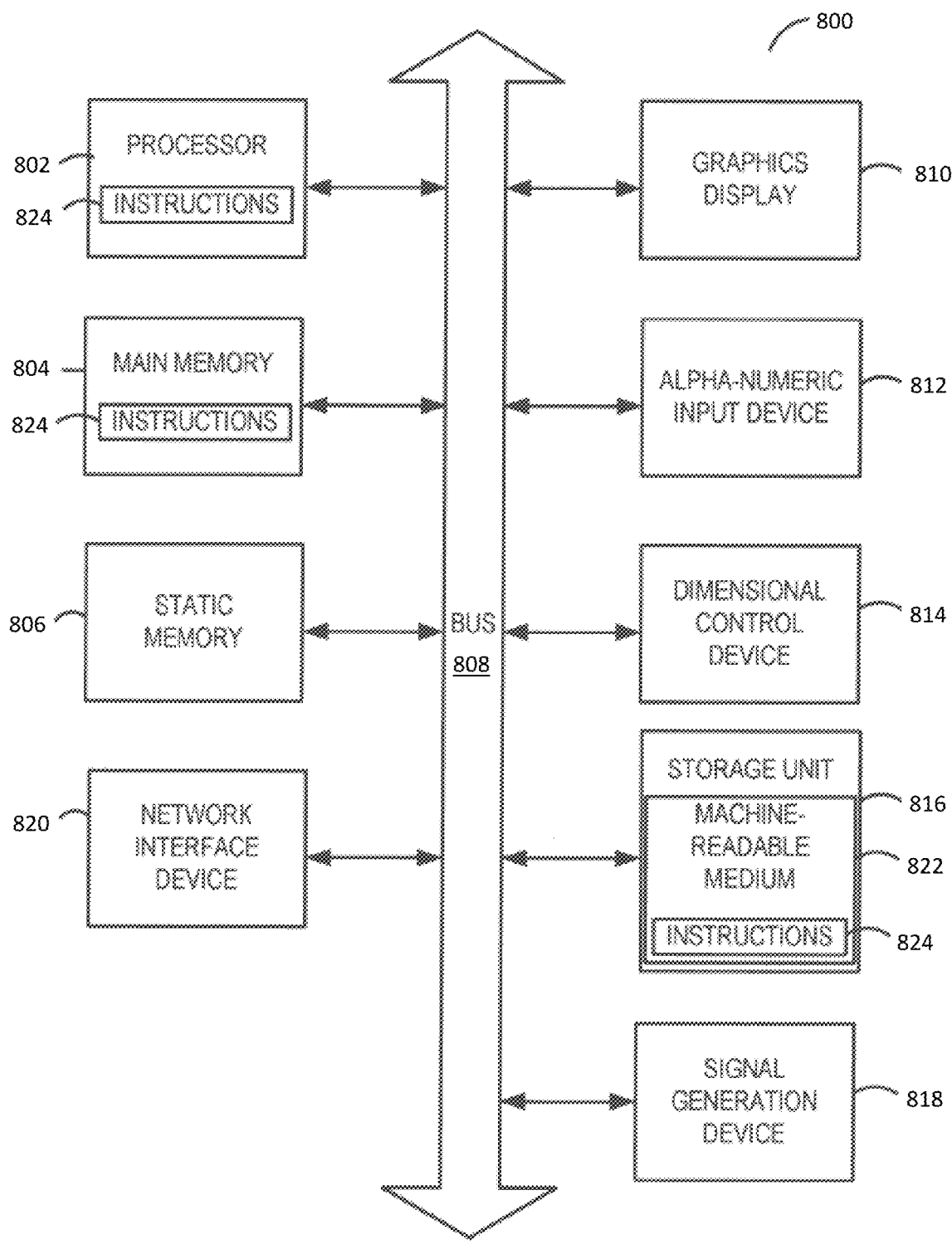
FIG. 8 is a block diagram of an exemplary implementation of a computing device, useful in performing the methodologies described herein.

FIG. 8 is a block diagram illustrating components of an example computing system able to read instructions from a computer-readable medium and execute them in one or more processors (or controllers). The computing system in FIG. 8 may represent an implementation of, for example, the video processing device for performing the stitching processes described herein.

The computing system 800 can be used to execute instructions 824 (e.g., program code or software) for causing the computing system 800 to perform any one or more of the methodologies (or processes) described herein. In alternative embodiments, the computing system 800 operates as a standalone device or a connected (e.g., networked) device that connects to other computer systems. The computing system 800 may comprise, for example, a personal computer (PC), a tablet PC, a notebook computer, or other device capable of executing instructions 824 (sequential or otherwise) that specify actions to be taken. In another embodiment, the computing system 800 may comprise a server. In a networked deployment, the computing system 800 may operate in the capacity of a server or client in a server-client network environment, or as a peer device in a peer-to-peer (or distributed) network environment. Further, while only a single computer system 800 is illustrated, a plurality of computing systems 800 may operate to jointly execute instructions 824 to perform any one or more of the methodologies discussed herein.

The example computing system 800 includes one or more processing units (generally processor 802). The processor 802 may include, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of the foregoing. The computing system 800 also includes a main memory 804. The computing system 800 may include a storage unit 816. The processor 802, memory 804 and the storage unit 816 may communicate via a bus 808.

In addition, the computing system 800 may include a static memory 806, a display driver 810 (e.g., to drive a plasma display panel (PDP), a liquid crystal display (LCD), or a projector). The computing system 800 may also include input/output devices, e.g., an alphanumeric input device 812 (e.g., touch screen-based keypad or an external input device such as a keyboard), a dimensional (e.g., 2-D or 3-D) control device 814 (e.g., a touch screen or external input device such as a mouse, a trackball, a joystick, a motion sensor, or other pointing instrument), a signal generation device 818 (e.g., a speaker), and a network interface device 820, which also are configured to communicate via the bus 808. Embodiments of the computing system 800 corresponding to a client device may include a different configuration than an embodiment of the computing system 800 corresponding to a server. For example, an embodiment corresponding to a server may include a larger storage unit 816, more memory 804, and a faster processor 802 but may lack the display driver 810, input device 812, and dimensional control device 814.

The storage unit 816 includes a computer-readable medium 811 on which is stored instructions 824 (e.g., software) embodying any one or more of the methodologies or functions described herein. The instructions 824 may also reside, completely or at least partially, within the main memory 804 or within the processor 802 (e.g., within a processor's cache memory) during execution thereof by the computing system 800, the main memory 804 and the processor 802 also constituting computer-readable media. The instructions 824 may be transmitted or received over a network via the network interface device 820.

While computer-readable medium 822 is shown in an example embodiment to be a single medium, the term "computer-readable medium" should be taken to include a single medium or multiple media (e.g., a centralized or distributed database, or associated caches and servers) able to store the instructions 824. The term "computer-readable medium" shall also be taken to include any medium that is capable of storing instructions 524 for execution by the computing system 500 and that cause the computing system 500 to perform, for example, one or more of the methodologies disclosed herein.

Where certain elements of these implementations can be partially or fully implemented using known components, only those portions of such known components that are necessary for an understanding of the present disclosure are described, and detailed descriptions of other portions of such known components are omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "computing device", includes, but is not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "camera" may be used to refer to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed:

1. A non-transitory computer-readable apparatus comprising a storage apparatus, the storage apparatus comprising instructions configured to, when executed by a processor apparatus, cause a computerized apparatus to:
    determine a stitch line in an optimal stitch zone for a spherical image;
    adjust, according to the determined stitch line, an orientation of the spherical image; and
    generate, based at least on the adjusted spherical image, a projection having the determined stitch line.

2. The non-transitory computer-readable apparatus of claim 1, wherein the instructions are further configured to, when executed by the processor apparatus, cause a computerized apparatus to:
    obtain a plurality of fisheye images captured via a plurality of image-capturing elements, the plurality of fisheye images comprising hyper-hemispherical images, the hyper-hemispherical images each having a field of view of greater than 180 degrees and being associated with one or more overlap areas, the one or more overlap areas configured to reduce discontinuity within the projection; and
    stitch the plurality of fisheye images based on the one or more overlap areas to generate the spherical image.

3. The non-transitory computer-readable apparatus of claim 1, wherein the instructions are further configured to, when executed by the processor apparatus, cause a computerized apparatus to:
derive a spherical image from a plurality of fisheye images, captured via a plurality of image-capturing elements, by mapping of a plurality of pixels associated with the plurality of fisheye images based on a Cartesian coordinate system or a spherical coordinate system.

4. The non-transitory computer-readable apparatus of claim 1, wherein the instructions are further configured to, when executed by the processor apparatus, cause a computerized apparatus to:
select the projection from a plurality of projections, wherein the selected projection is a cubic projection.

5. The non-transitory computer-readable apparatus of claim 1, wherein the instructions are further configured to, when executed by the processor apparatus, cause a computerized apparatus to:
select the projection from a plurality of projections, wherein the selected projection comprises an octahedron projection.

6. The non-transitory computer-readable apparatus of claim 1, wherein the projection comprises a plurality of image facets, and the stitch line traverses a plurality of contiguous ones of the plurality of image facets.

7. The non-transitory computer-readable apparatus of claim 1, wherein the stitch line is located along a meridian plane associated with the spherical image.

8. A system comprising:
a processor apparatus; and
computerized logic executable by the processor apparatus, the computerized logic being configured to:
determine a stitch line in an optimal stitch zone for a spherical image;
adjust, according to the determined stitch line, an orientation of the spherical image; and
generate, based at least on the adjusted spherical image, a projection having the determined stitch line.

9. The system of claim 8, wherein the computerized logic being further configured to:
obtain a plurality of fisheye images captured via a plurality of image-capturing elements, the plurality of fisheye images comprising hyper-hemispherical images, the hyper-hemispherical images each having a field of view of greater than 180 degrees and being associated with one or more overlap areas, the one or more overlap areas configured to reduce discontinuity within the projection; and
stitch the plurality of fisheye images based on the one or more overlap areas to generate the spherical image.

10. The system of claim 8, wherein the computerized logic being further configured to:
derive the spherical image from a plurality of fisheye images, captured via a plurality of image-capturing elements, by mapping of a plurality of pixels associated with the plurality of fisheye images based on a Cartesian coordinate system or a spherical coordinate system.

11. The system of claim 8, wherein the computerized logic being further configured to:
select the projection from a plurality of projections, wherein the selected projection is a cubic projection.

12. The system of claim 8, wherein the computerized logic being further configured to:
select the projection from a plurality of projections, wherein the selected projection comprises an octahedron projection.

13. The system of claim 8, wherein the projection comprises a plurality of image facets, and the stitch line traverses a plurality of contiguous ones of the plurality of image facets.

14. The system of claim 8, wherein the stitch line is located along a meridian plane associated with the spherical image.

15. A computerized method of generating a projection, the computerized method comprising:
determining a stitch line in an optimal stitch zone for a spherical image;
adjusting, according to the determined stitch line, an orientation of the spherical image; and
generating, based at least on the adjusted spherical image, a projection having the determined stitch line.

16. The computerized method of claim 15, the method further comprising:
obtaining a plurality of fisheye images captured via a plurality of image-capturing elements, the plurality of fisheye images comprising hyper-hemispherical images, the hyper-hemispherical images each having a field of view of greater than 180 degrees and being associated with one or more overlap areas, the one or more overlap areas configured to reduce discontinuity within the projection; and
stitching the plurality of fisheye images based on the one or more overlap areas to generate the spherical image.

17. The computerized method of claim 15, the method further comprising:
deriving the spherical image from a plurality of fisheye images, captured via a plurality of image-capturing elements, by mapping of a plurality of pixels associated with the plurality of fisheye images based on a Cartesian coordinate system or a spherical coordinate system.

18. The computerized method of claim 15, the method further comprising:
selecting the projection from a plurality of projections, wherein the selected projection is a cubic projection.

19. The computerized method of claim 15, the method further comprising:
selecting the projection from a plurality of projections, wherein the selected projection comprises an octahedron projection.

20. The computerized method of claim 15, wherein the projection comprises a plurality of image facets, and the stitch line traverses a plurality of contiguous ones of the plurality of image facets.

* * * * *